(12) United States Patent
Huinink et al.

(10) Patent No.: US 12,495,806 B2
(45) Date of Patent: Dec. 16, 2025

(54) CUTTING DEVICE, A SYSTEM INCLUDING A CUTTING DEVICE AND A METHOD FOR CUTTING FREE A RECTUM END PORTION OF AN ANIMAL CARCASS

(71) Applicant: MAREL RED MEAT B.V., Lichtenvoorde (NL)

(72) Inventors: Maarten Christiaan Huinink, Lichtenvoorde (NL); Arno Hermanus Maria Ueffing, Lichtenvoorde (NL)

(73) Assignee: MAREL RED MEAT B.V., Lichtenvoorde (NL)

( * ) Notice: Subject to any disclaimer, the term of this patent is extended or adjusted under 35 U.S.C. 154(b) by 0 days.

(21) Appl. No.: 18/692,924

(22) PCT Filed: Sep. 28, 2022

(86) PCT No.: PCT/EP2022/076897
§ 371 (c)(1),
(2) Date: Mar. 18, 2024

(87) PCT Pub. No.: WO2023/052382
PCT Pub. Date: Apr. 6, 2023

(65) Prior Publication Data
US 2024/0373865 A1   Nov. 14, 2024

(30) Foreign Application Priority Data
Sep. 29, 2021  (EP) .................................. 21199930

(51) Int. Cl.
*A22B 5/00* (2006.01)
(52) U.S. Cl.
CPC .......... *A22B 5/0094* (2013.01); *A22B 5/0041* (2013.01)

(58) Field of Classification Search
CPC ............................ A22B 5/0094; A22B 5/0041
(Continued)

(56) References Cited

U.S. PATENT DOCUMENTS

| | | | |
|---|---|---|---|
| 4,023,237 | A | 5/1977 | Meyn |
| 5,199,922 | A | 4/1993 | Korenberg et al. |

(Continued)

FOREIGN PATENT DOCUMENTS

| | | |
|---|---|---|
| CN | 203482816 U | 3/2014 |
| CN | 203482817 U | 3/2014 |

(Continued)

OTHER PUBLICATIONS

International Search Report from corresponding PCT Application No. PCT/EP2022/076897, Jan. 24, 2023.

(Continued)

*Primary Examiner* — Richard T Price, Jr.
(74) *Attorney, Agent, or Firm* — Workman Nydegger

(57) ABSTRACT

A cutting device for cutting loose a rectum end portion of an animal carcass, includes: a carrying member; a drilling member rotatably mounted on the carrying member having a tubular drilling wall portion surrounding an interior drilling space; a centering mandrel arranged coaxially with the drilling wall portion, the mandrel having a leading end configured to enter an anal opening of the carcass, at least a portion of the mandrel circumferentially surrounded by the drilling wall portion so as to define an annular space circumferentially surrounding the mandrel; suction means for applying suction to the interior drilling space via one or more inlet openings. The cutting device defining one or more venting openings, different from the one or more inlet openings and different from the open cutting end, configured to allow air to enter the interior drilling space.

30 Claims, 13 Drawing Sheets

(58) Field of Classification Search
 USPC .......................................................... 452/106
 See application file for complete search history.

(56) References Cited

U.S. PATENT DOCUMENTS

| | | | |
|---|---|---|---|
| 5,580,304 A | 12/1996 | Bleth et al. | |
| 6,193,595 B1* | 2/2001 | Volk | A22C 21/06 452/179 |
| 10,869,487 B2 | 12/2020 | Giezenaar et al. | |
| 2009/0093205 A1* | 4/2009 | Lay | A22B 5/0094 30/342 |
| 2018/0042247 A1 | 2/2018 | Jane Lopez | |

FOREIGN PATENT DOCUMENTS

| | | |
|---|---|---|
| CN | 107404884 A | 11/2017 |
| CN | 109475131 A | 3/2019 |
| EP | 0450730 A1 | 4/1991 |
| EP | 0460740 A1 | 5/1991 |
| EP | 0722666 A1 | 7/1996 |
| EP | 0820697 A2 | 1/1998 |
| NL | 1013952 C1 | 6/2001 |
| NL | 1015137 C2 | 6/2001 |
| WO | 9206597 A1 | 4/1992 |
| WO | 2008069662 A2 | 6/2008 |
| WO | 2013119106 A1 | 8/2013 |

OTHER PUBLICATIONS

Extended European Search Report from corresponding EP Application No. 21199930.5, Apr. 8, 2022.

Chinese Office Action from Corresponding Chinese Patent Application No. CN202280064107.5, Jul. 18, 2025.

* cited by examiner

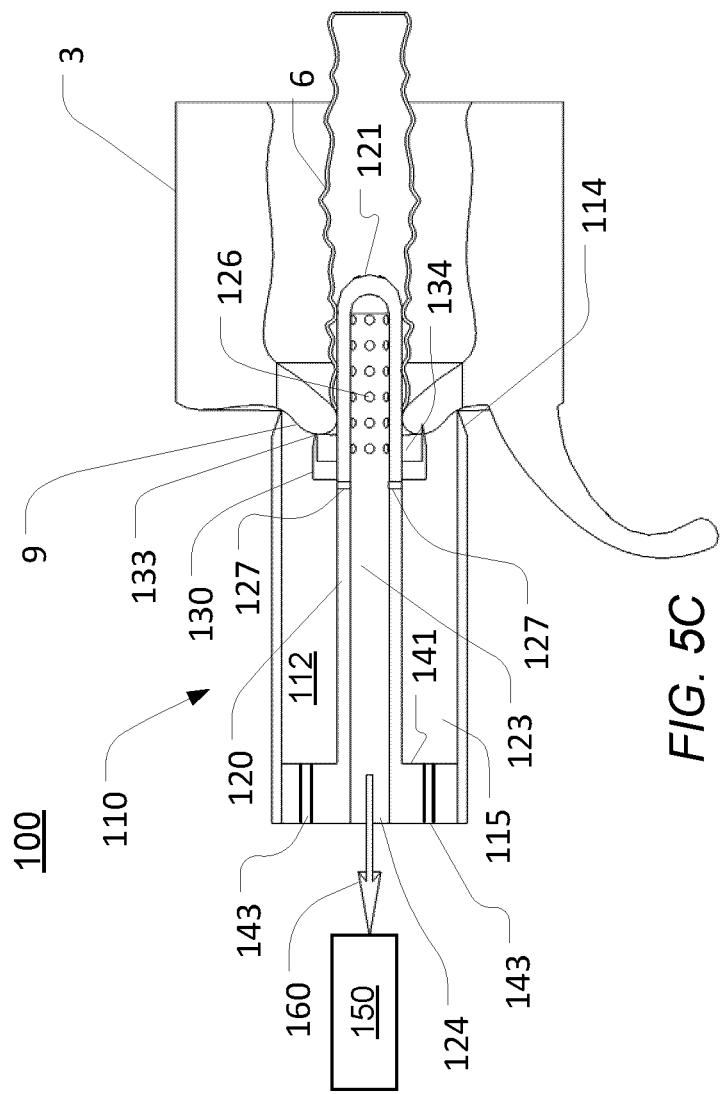

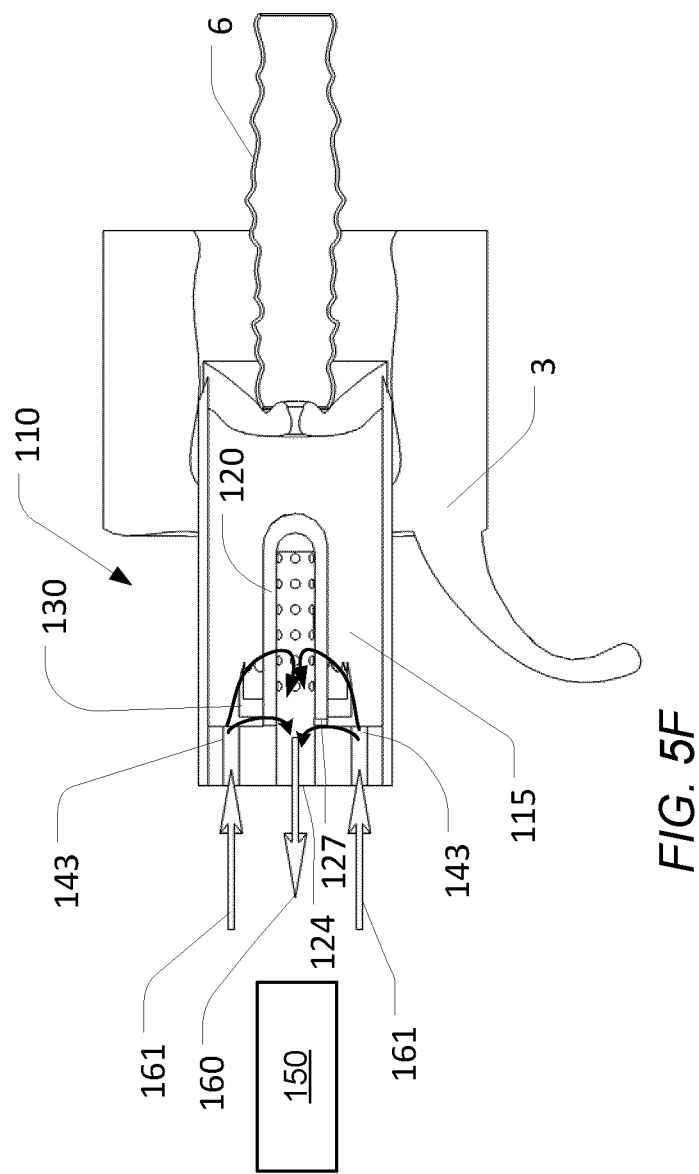

CUTTING DEVICE, A SYSTEM INCLUDING A CUTTING DEVICE AND A METHOD FOR CUTTING FREE A RECTUM END PORTION OF AN ANIMAL CARCASS

TECHNICAL FIELD

The present disclosure relates to a cutting device and a method for cutting loose a rectum end portion of a carcass, such as pigs. The present disclosure further relates to a system including such a cutting device.

BACKGROUND

When processing slaughtered animals, e.g. pig carcasses, it is important to avoid or significantly reduce the risk of contaminating the meat with the substances being located in the stomach and the intestines of the carcass, such as fecal matter. During processing an animal carcass, the attachment of the intestines to the skin at the anal opening is often cut loose. The intestine end (the rectum end) may then be handled, e.g. closed, during the further processing of the carcass until the viscera can be released fully and removed from the carcass. Cutting devices can be used to cut the skin and the underlying structure around the anal opening. For the purpose of the present disclosure, such cutting devices are sometimes also referred to as bung drillers.

Such cutting devices may comprise a cutting edge at the end of a cylindrical wall member of a drilling member, where a mandrel is centralized in the drilling member. During operation of the cutting device, a leading end of the mandrel is entered into the anal opening of the carcass and part of the rectum (which may also be referred to as the bung) and the cutting edge cuts around the anal opening and the rectum end.

WO2013119106 (A1) describes a rectal cutting device that comprises a cutting member rotatably mounted on a carrying member, which cutting member comprises a cylindrical wall portion surrounding an interior space, wherein the cylindrical wall portion has a top end with a cutting edge; a centering mandrel arranged coaxially within the cylindrical wall portion, a free end of which reaches past the cutting edge; rotation driving means for rotating the cutting member with respect to the carrying member, and suction means for creating a vacuum inside the interior space of the cutting member, having an axially movable ejecting member within the interior space of the cutting member and ejection driving means for axially moving the ejecting member. In the cutting step, the cutting member is activated and driven to rotate such that it cuts through the tissue surrounding the rectum end portion. In this process, the carrying member is displaced such as to move the cutting member deeper into the tissue. During cutting, the suction means maintain a vacuum in the inner interior space portion of the cutting member, which vacuum is transferred to the outer interior space portion by air being sucked past the flexible membrane. Parts of the rectum end portion being cut loose are thereby sucked into said outer portion of the interior space. The cutting process is continued until the rectum end portion has been cut loose along its complete length.

Vacuum in the prior art bung drilling process is used to provide a holding force on the skin inside the cutting device such that the knife is capable of cutting into the skin, hereby avoiding the drilling member pressing onto the skin instead of cutting into the skin. However, the vacuum effect may result in the anal opening being opened or turned inside out. This may cause feces being released from the rectum and getting in contact with the skin surrounding the anal opening from where microorganisms can be spread. Hereby the risk of contamination of meat is increased.

It thus remains desirable to provide a cutting device and corresponding process that reduce the risk of contamination, such as contamination resulting from the turning inside out of the anal opening during the cutting process, or that at least provides an alternative to existing cutting devices or processes.

SUMMARY

According to a first aspect, disclosed herein are embodiments of a cutting device for cutting loose a rectum end portion of an animal carcass. The cutting device comprises:
  a carrying member,
  a drilling member rotatably mounted on the carrying member, the drilling member comprising a tubular drilling wall portion surrounding an interior drilling space, the drilling wall portion having an open cutting end and a rear end opposite the open cutting end,
  a centering mandrel arranged coaxially with the drilling wall portion, the mandrel having a leading end, the leading end being configured to enter an anal opening of the carcass, at least a portion of the mandrel being circumferentially surrounded by the drilling wall portion so as to define an annular space circumferentially surrounding the mandrel,
  suction means for applying suction to the interior drilling space via one or more inlet openings,
  wherein the cutting device further comprises one or more venting openings, different from the one or more inlet openings and different from the open cutting end, configured to allow air to enter the interior drilling space, in particular fresh air that has not been contaminated by contaminants from intestines of a carcass.

Accordingly, as airflow is allowed to enter the interior drilling space, in particular the annular space surrounding the mandrel, through one or more separate venting openings, which are different from the one or more inlet openings and different from the open cutting end, the airflow may include fresh air that has not been in contact and, hence, not been contaminated with contaminants from the intestines of a carcass. In particular, the fresh air entering through the one or more venting openings has not been contaminated by the rectum end portion that is entering the interior drilling space through the open cutting end. The fresh air entering through the one or more venting openings has not been contaminated either by contaminants that have previously been sucked out of the interior drilling space via the one or more inlet openings and that may still be present in hoses or other conduits that fluidly connect the one or more inlet openings with the suction means. The cutting device thus allows a one-way airflow to be established from the one or more venting openings to the one or more inlet openings. Operation of the cutting device does not require a reversal of airflow, in particular not a reversal of airflow through the inlet openings, for flushing out contaminants from the interior drilling space, thus reducing the risk of contaminations of the carcass. The one or more venting openings are preferably configured to allow air to enter the interior drilling space, in particular the annular space surrounding the mandrel, while suction is applied by the suction means through the one or more inlet openings to at least the annular space, i.e. to the annular portion of the interior drilling space that surrounds the mandrel.

The cutting device may be configured to control the amount of air being allowed to enter through the one or more venting openings. In particular, the cutting device may be configured to selectively allow air to enter the interior drilling space during only a part of the cutting process or to allow more air to enter the interior drilling space during one part of the cutting process than during another part. For example, in some embodiments the cutting device is configured to allow air to enter the interior drilling space through the one or more venting openings only after insertion of the open cutting end into the carcass or only after cutting free of the rectum end portion, e.g. only during and/or after withdrawal of the open cutting end from the carcass and/or from the cut-free rectum end portion.

To this end, in some embodiments, the drilling member further comprises one or more venting valves configured to control an airflow into the interior drilling space through the one or more venting openings, in particular to control the amount of air being allowed to enter the interior drilling space through the one or more venting openings. In one embodiment, the one or more venting valves are configured, during and/or after withdrawal of the open cutting end from the carcass after cutting loose the rectum end portion, to selectively allow air to enter the annular space through the one or more venting openings while suction is applied by the suction means to at least the annular space surrounding the mandrel.

Accordingly, when the drilling member is withdrawn from the carcass and the cut-out rectum end portion is dropped from the drilling member, some—preferably all or a major part—of any contaminants, in particular feces, that may have spilled out of the anal opening during the cutting process into the annular space of the drilling member, are sucked up by the cutting device rather than being dropped or even pressed out of the drilling member together with the rectum end portion. In particular, allowing air to enter the annular space surrounding the mandrel while maintaining suction during withdrawal of the drilling member from the carcass allows the suction means to create an airflow that carries feces and/or other contaminants out of the annular space in a controlled manner.

The cutting device and process disclosed herein may be used for processing different types of animals. Accordingly, the animal carcass may be a carcass of any slaughtered animal, such as slaughtered at an abattoir. The animal may be e.g. a pig, poultry, cattle/cow, a goat, a sheep etc. Preferably, the cutting device is for use with pig carcasses.

In various embodiments, the suction means is configured to apply suction to the annular space circumferentially surrounding the mandrel. In some embodiments, the suction means is configured to create a vacuum in the annular space for sucking a part of the rectum end and surrounding tissue, which has already been cut loose, into the interior drilling space. The suction means may be configured to create a vacuum in the interior drilling space, in particular in the annular space, at least when the one or more venting valves are closed or set to only allow a reduced airflow to enter the interior drilling space. The vacuum created within the annular space during the cutting serves to pull the skin surrounding the anal opening during cutting to get a clean cut and to prevent damaging the rectum with the cutting edge. During the cutting process, the part of the rectum end and surrounding tissue, which has already been cut loose, is sucked further into the interior drilling space. When the open cutting end of the drilling wall portion reaches the abdominal cavity of the carcass, the entire rectum end portion has been cut loose and is accommodated inside the interior drilling space of the drilling member. Accordingly, for the purpose of the present disclosure, the term vacuum inside the interior drilling space is to be understood as a pressure difference between the interior drilling space and the ambient atmosphere that is sufficiently large to pull the rectum during the cutting.

In some embodiments, the one or more venting valves are further configured to selectively prevent air completely or partly from entering the annular space through the one or more venting openings during at least a part of the actual cutting operation, i.e. while the cutting device is advanced into the carcass and cuts tissue. Accordingly, when the one or more venting valves prevent air from entering the annular space through the one or more venting openings (or only allow a reduced airflow) and while the open cutting end of the drilling member is substantially closed/blocked by tissue of the carcass, the suction means can create and maintain a vacuum in the annular space. When the one or more venting valves allow air to enter the annular space through the one or more venting openings during and/or after withdrawal of the drilling member from the carcass, operation of the suction means causes airflow inside the annular space that can flush out contaminants from the annular space by the suction means, thus preventing the sucked up contaminants from spilling out of the open cutting end during release of the rectum end portion that has been cut free.

Control of the one or more venting valves may be performed by a suitable control means. In particular, in some embodiments, the cutting device comprises control means for controlling operation of the one or more venting valves, wherein the control means is configured:

during an initial cutting stage, to partly or completely close the one or more venting valves and to control the suction means to create a vacuum in at least the annular space surrounding the mandrel;

during a subsequent withdrawal stage, in particular during and/or after withdrawal of the open cutting end from the carcass and/or from the cut-free rectum end portion, to open the one or more venting valves and to control the suction means to apply suction to at least the annular space surrounding the mandrel.

For example, the control means may be a suitably configured electrical control circuit configured to control the venting valve, e.g. a suitably programmed or otherwise configured microprocessor, a PLC, an industrial control unit, and/or the like. Alternatively, the control means may be a mechanical, pneumatic or other suitable control mechanism, e.g. a manually controllable vale and/or the like. The control means may be configured to control the one or more venting valves automatically, e.g. as part of an automatic control of the cutting process. Alternatively or additionally, the control means may be configured to control the one or more venting valves in response to a user input, e.g. by the user operating a suitable actuator such as a button or a switch. The control means may be local control means accommodated in the same housing or support structure as the carrying member or it may be a remote control means communicatively connected to e.g. the carrying member, e.g. via a wired or wireless connection. The control means may be configured to also control other operations of the cutting device, such as the suction means, a motor or other drive means for rotating the drilling member, etc. The one or more venting valves may be accommodated in the carrying member or at another suitable location.

The one or more venting openings are different from and preferably displaced from the open cutting end. When the one or more venting openings are located proximal the rear end of the tubular drilling wall portion, the created airflow can efficiently transport contaminants accumulated at the rear end of the annular space towards an inlet opening, through which the suction means applies suction, and away from the open cutting end. To this end, in some embodiments, the cutting device comprises one or more suction conduits fluidly connecting the suction means to the interior drilling space, e.g. to an interior mandrel space of the mandrel and/or to the annular space surrounding the mandrel. The one or more suction conduits have inlet openings into the interior drilling space, in particular into the interior mandrel space and/or into the annular space. The one or more inlet openings are preferably located proximal the rear end of the mandrel or of the drilling member. The cutting device may further comprise one or more venting conduits for transporting airflow via the one or more venting openings into the interior drilling space. Preferably, the venting conduits are physically separate from the suction conduits through which suction is applied, thus allowing to restrict airflow through the venting conduits and/or through the suction conduits to be a one-way airflow only.

In some embodiments, the cutting device comprises an end wall portion, which may be part of the drilling member or of the carrying member, axially delimiting the interior drilling space in the axially rearward direction, opposite the open cutting end. The one or more venting openings and/or the one or more inlet openings may be located in the rear wall portion. In one embodiment, the one or more venting openings are located in a radially outward part of the end wall portion, e.g. adjacent to or in a circumferential edge defined between the drilling wall portion and the end wall portion. In some embodiments, the one or more inlet openings are located centrally on or adjacent the longitudinal axis of the drilling member.

In some embodiments, the mandrel is a rod or tube with a closed leading end or tip located towards or in the region of the open cutting end of the drilling member, or axially protruding out of the open cutting end. In some embodiments, the mandrel comprises a mandrel wall portion surrounding an interior mandrel space. Accordingly, all, or at least a portion of the interior mandrel space, which is located inside the drilling member and is circumferentially surrounded by the tubular drilling wall portion, constitutes a part of the interior drilling space. The mandrel wall portion may be a tubular wall portion. In some embodiments, the mandrel wall portion comprises one or more suction openings arranged proximal the leading end of the mandrel, e.g. a plurality of suction openings distributed around the circumference of the mandrel wall portion, and located at one or more spaced-apart axial positions along the mandrel. When suction is applied to the interior mandrel space, radial inward suction is caused at the one or more suction openings. Accordingly, when the mandrel is advanced through the anal opening of a carcass into the rectum end, the intestine walls of the rectum end are sucked radially inwards to snuggly adhere to the mandrel. Moreover, some feces or other contaminants from the inside of the rectum end may be sucked into the interior mandrel space. Accordingly, the risk that contaminants exit the anal opening and contaminate the skin surrounding the anal opening during the cutting operation is reduced.

In some embodiments, the mandrel wall portion comprises one or more connecting conduits, in particular one or more through holes in the mandrel wall portion or other form of air channels, configured to provide fluid communication between the interior mandrel space and the annular space surrounding the mandrel. The one or more connecting conduits are preferably located proximal, in particular directly adjacent to, the rear end of the tubular drilling wall portion. When the mandrel is axially movable, the one or more connecting conduits are preferably located proximal, in particular directly adjacent to, the rear end of the tubular drilling wall portion when the mandrel is in a retracted, most rearward position. Accordingly, when suction is applied to the interior mandrel space as described below, suction is also applied to the annular space surrounding the mandrel via the connecting conduits. Alternatively or additionally, suction to the annular space surrounding the mandrel may be applied via one or more additional inlet openings, e.g. located in an end wall portion that axially delimits the annular space or in the tubular drilling wall portion.

In some embodiments, the suction means is fluidly connected to the interior mandrel space and configured to apply suction directly to the interior mandrel space via the one or more inlet openings, i.e. the mandrel may comprise the one or more inlet openings, e.g. at the rear end of the mandrel, e.g. in a rear end wall of the mandrel or as an open rear end of a tubular interior mandrel space. In particular, the suction means may be configured to apply suction in an axial, rearward direction or otherwise away from the open cutting end and/or away from the annular space surrounding the mandrel. The drilling member may thus be further configured such that the suction means applies suction to the annular space via the one or more inlet openings and the one or more connecting conduits, i.e. the suction means applies suction out of the annular space and into the interior mandrel space via the one or more connecting openings, and the suction means applies suction out of the interior mandrel space through the one or more inlet opening. Accordingly, when the one or more venting valves allow air to enter the annular space through the one or more venting openings, the suction means causes an airflow from the one or more venting openings into the annular space, from the annular space through the one or more connecting conduits into the interior mandrel space and further towards and out of the one or more inlet openings.

In some embodiments, the interior mandrel space comprises an inner tubular portion and an outer portion circumferentially at least partly surrounding the inner tubular portion and radially separated from the inner tubular portion by one or more dividing walls. In some embodiments, the outer portion is an annular outer portion separated from the inner tubular portion by a tubular dividing wall. In other embodiments, the outer portion is a manifold, e.g. including multiple longitudinal channels, each extending longitudinally along the inner tubular portion, distributed circumferentially around the inner tubular portion. The inner tubular portion has a leading end proximal the leading end of the mandrel and a rear end opposite the leading end. In some embodiments, the inner tubular portion is fluidly connected to the outer portion at the leading end of the inner tubular portion. In some embodiments, the inner tubular portion comprises the one or more inlet openings. The suction means may thus be configured to apply suction to the inner tubular portion of the interior mandrel space via the one or more inlet openings in a direction away from the leading end of the inner tubular portion. The one or more suction openings of the mandrel may fluidly connect the outer portion of the interior mandrel space with the surrounding of the mandrel. In one embodiment, the one or more connecting conduits connect the annular space surrounding the mandrel directly with the inner tubular portion of the interior mandrel space, thereby providing a relatively short passage for the air, thus reducing the risk of fat tissue blocking the air passage while providing an efficient airflow for cleaning out contaminants from the rear portion of the annular space as well as from the entire length of the interior mandrel space. In an alternative embodiment, the one or more connecting conduits connect the annular space surrounding the mandrel with the outer portion of the interior mandrel space. Accordingly, when the one or more venting valves allow air to enter the annular space through the one or more venting openings, the suction means causes an airflow from the one or more venting openings through the one or more connecting conduits into the outer portion of the interior mandrel space, then towards the leading end of the mandrel and into the leading end of the inner tubular portion of the interior mandrel space. From there, the airflow continues rearward along the inner tubular portion to the one or more inlet openings. Accordingly, an efficient airflow for cleaning out contaminants from the rear portion of the annular space as well as from the entire length of the interior mandrel space is provided.

Preferably, the drilling member is configured to be able to hold a sufficient pressure difference relative to the ambient air outside the drilling member during the duration of the drilling process. In particular, when the open cutting end of the tubular drilling wall is in contact with a carcass and substantially closed by tissue of the carcass, a pressure difference may be established and maintained by the suction means between the annular space surrounding the mandrel and the outside of the drilling member. To establish such a pressure difference the drilling member may be 'intact' or air-tight, meaning without significant openings or incisions in the tube body, in particular in the circumferential drilling wall portion. While the absence of any openings allows for a most efficient establishment of a pressure difference, it will be appreciated that smaller openings or incisions may be present in the drilling wall portion of the drilling member without preventing the drilling member from holding a sufficient pressure difference relative to the outside. For example, such incisions may be located in the cutting blade making the cutting blade more aggressive. The created vacuum inside the drilling member also efficiently prevents any contaminations from leaving the interior drilling space through the open cutting end during the cutting process. In some embodiments, the tubular drilling wall portion has an annular cutting blade at its open cutting end, which preferably is intact or unbroken, such as not being a saw.

When the leading end of the mandrel is configured to protrude out of the open cutting end of the tubular drilling wall portion, either permanently or in an extended position of an axially movable mandrel, the leading end of the mandrel may be inserted into the anal opening prior to the drilling wall portion engaging and cutting the tissue surrounding the anal opening.

The mandrel may be arranged axially fixedly relative to the drilling member or it may be arranged axially movable relative to the drilling member. In particular, in some embodiments, the mandrel is axially movable between at least a retracted position and an extended position, wherein the leading end of the mandrel protrudes out of the open cutting end of the tubular drilling wall portion when the mandrel is in its extended position and wherein the leading end of the mandrel is located within the interior drilling space when the mandrel is in its retracted position. During the cutting operation, i.e. while the drilling member cuts and advances deeper into the carcass, the mandrel may thus move rearwards into the interior drilling space as the rectum end portion is sucked into the interior drilling space. For example, the mandrel, or at least a rear portion thereof, may be provided as a piston, e.g. a pneumatic piston, that can be controlled to extend or retract relative to the carrying member.

In some embodiments, the one or more connecting conduits are located inside the interior drilling space when the mandrel is in its retracted position and when the mandrel is in its extended position. In particular, in some embodiments, the one or more connecting conduits are located proximal, e.g. directly adjacent, to the rear end of the interior drilling space when the mandrel is in its retracted position.

In some embodiments, the cutting device further comprises a bung holder surrounding at least a part of the mandrel. In some embodiments, the bung holder is circular and/or cup-shaped and extends circumferentially around the mandrel. The bung holder may have an overall outer diameter smaller than an inner diameter of the tubular drilling wall portion. In some embodiments there is space between the outer circumference of the bung holder and the tubular drilling wall portion, thereby creating an annular space between, on the radial inward side, the outside periphery of the bung holder and the outside periphery of at least a portion of the mandrel and, on the radial outward side, the inside of the tubular drilling wall portion. In one embodiment the bung holder has a circumferential surface without rearward openings, i.e. without openings towards the inside and rear end of the drilling member. The bung holder is open in the region towards the open cutting end of the drilling member. The bung holder preferably defines an inner volume separate from the remaining volume inside the drilling member when the open cutting end engages the carcass. Accordingly, two separate volumes are created that are capable of accommodating possible contaminants and reducing spread of contaminants especially from the volume inside the bung holder to the annular space surrounding the mandrel and the bung holder.

In some embodiments the bung holder has holding means capable of engaging with the outside of the carcass. The holding means may be located at the edge of the cup-shaped bung holder i.e. between the closed and the open part of the bung holder. The bung holding means are capable of engaging with the outside of the carcass i.e. with the skin area surrounding the anal opening of a carcass. The holding means of the bung holder are capable of holding the skin such that it does not turn when the bung driller is drilling into the skin and into the carcass where the drilling process provides turning forces to the skin surface. Another function of the holding means is to prevent the anal opening of the carcass from turning inside out, e.g. when a vacuum may be made inside the drilling member during drilling, or to at least reduce the extent or risk of this to happen. Hereby at least the main part of fecal matter is kept inside the rectum. In one embodiment, the holding means of the bung holder comprises teeth or other structures capable of engaging with the skin surface of the carcass. The function of the teeth are to obtain a good grip of the skin and not to cut into the skin except for any cutting to obtain the good grip. The teeth may have any form suitable to engage with the skin of a carcass, such as pointed.

In some embodiments, the bung holder is configured to rotate around the mandrel. In some embodiments, the bung holder can slide in the axial direction within the drilling member. The bung holder is preferably capable of rotating relative to the drilling member and can be non-turning relative to the carcass during the drilling process. In a preferred embodiment, the bung holder and the mandrel are connected such that they can slide axially inside the drilling member. Hereby the bung holder may be located at a fixed position along the longitudinal direction of the mandrel, though the bung holder may still rotate around the mandrel.

In some embodiments, the bung holder has a circumferential wall portion that is airtight. Accordingly, the bung holder defines an interior bung holder volume inside of the bung holder. The interior bung holder volume can be a closed volume when the holding means of the bung holder engage with the outside of a carcass. Thus, the cutting device may be constructed with a bung holder volume located between the outside of the carcass skin, the outside of the leading portion of the mandrel and the inside of the bung holder. This bung holder volume encircles the mandrel just outside the anal opening and part of the carcass skin surrounding the anal opening.

As explained above, the mandrel may comprise one or more suction openings proximal to the leading end of the mandrel. In some embodiments, the one or more suction openings are located in a region between the closed, leading end of the mandrel and the bung holder, such as between the closed leading end of the mandrel and the part of the bung holder making up the boundary towards the inside of the drilling member, such that suction openings may be located along the mandrel and/or inside the bung holder volume of the bung holder. In an embodiment, the mandrel has a non-filled or open inner volume and openings at least in part of the region towards the closed leading end. Preferably, no suction openings are located at the outermost leading end or tip of the mandrel, such as within the outermost 0.5 cm, 1 cm, 1.5 cm, or 2 cm.

Air valves may be located in the bung holder between a bung holder volume inside the bung holder and an annular space inside the drilling member surrounding the bung holder. Such air valves may be capable of letting air e.g. including contaminants being aspirated from the bung holder volume to the annular space or from the annular space to the interior mandrel space. The airflow direction through air valves located in the bung holder may be determined by the location of suction means connected to the mandrel to aspirating air away from the volume inside the mandrel or suction means connected to the drilling member aspirating air away from the annular space surrounding the mandrel.

In some embodiments, the suction openings in the mandrel are made such that one or more suction openings are located inside the area located inside the bung holder i.e. in the bung holder volume. Alternatively or additionally, one or more suction openings are located in the part of the mandrel that is inserted into the intestine or rectal end of a carcass to process. Preferably, the outer tip of the mandrel does not include suction openings.

In some embodiments, the suction openings are located along a region of the mandrel, such as located in respective ring-shaped arrangements around the circumference of the mandrel at different axial positions. The suction openings may be located along the mandrel, such as in a region nearby the leading end, 2 to 10 of the ring-shaped arrangements with openings may be present, such as 4-8, e.g. 5-7, such as 6 ring-shaped arrangements. Each ring-shaped arrangement may comprise 4-8 openings, such as 6 openings. The size of the openings can be determined in accordance to the type of carcass to process. A holding effect by suction of the intestine or rectum end is obtained when the vacuum is established. A vacuum inside the bung holder i.e. in the bung holder volume may also be created.

The suction means may be configured to apply suction to the mandrel and/or to the annular space surrounding the mandrel. In some embodiments, the suction means is in fluid communication with the interior mandrel space, and the suction means is configured to apply suction to the interior mandrel space, in particular to the rear end of the interior mandrel space. When the mandrel is inserted into the anal opening and when the open cutting end of the drilling member engages the rectum end portion of the carcass the applied suction causes a vacuum to be created in the interior mandrel space and/or in the interior drilling space, in particular in the annular space surrounding the mandrel.

The suction means may be a pump, in particular a vacuum pump, or another suitable device for applying suction, such as a connecting port for connecting a hose or pipe to the cutting device so as to connect the cutting device to an external vacuum pump or other source of suction.

Cutting devices for processing animal carcasses are known as such to the person skilled in the art. For this reason, the person skilled in the art knows suitable materials of the different components of the cutting device, which may preferably be made from material such as metal approved for use at abattoirs. The material may be capable of being cleaned frequently, such as after each use. Some parts or units of the cutting device, such as bearings, may be made of a polymeric material. The overall design and function of cutting devices are known and need not be described here.

A second aspect disclosed herein relates to a method for cutting free a rectum end portion of an animal carcass by cutting around the anal opening and rectum end with a cutting device, the method comprising:

advancing a leading end of a mandrel into the anal opening of the animal carcass, cutting around the anal opening and along a part of the rectum end of the carcass with an open cutting end of a tubular drilling wall portion of a rotating drilling member, the tubular drilling wall portion defining an interior drilling space, at least a portion of the mandrel being circumferentially surrounded by the drilling wall portion so as to define an annular space surrounding the mandrel, applying suction via one or more inlet openings to the interior drilling space, in particular to at least the annular space, so as to create a vacuum in at least the annular space during the drilling, allowing air to enter the annular space through one or more venting openings of cutting device, the one or more venting openings being different from the one or more inlet openings and from the open cutting end of the drilling wall portion.

In some embodiments, the method further comprises:

withdrawing the drilling member and the mandrel from the carcass, applying suction via the one or more inlet openings to at least the annular space while and/or after withdrawing the drilling member and the mandrel from the carcass, wherein allowing air to enter the annular space comprises allowing air to enter the annular space through the one or more venting openings at least while and/or after withdrawing the drilling member and the mandrel from the carcass. In some embodiments, air is allowed to enter the annular space through the one or more venting openings only while and/or after withdrawing the drilling member and the mandrel from the carcass.

In some embodiments, the method comprises controlling an airflow into the interior drilling space through the one or more venting openings by operating one or more venting valves.

In an embodiment of the method, the cut-free rectum end portion is dropped or otherwise delivered to the inside of the carcass. In some embodiments, the cut-free rectum end portion may otherwise be dropped or delivered on the outside of the carcass, e.g. on the belly side of the carcass, or it may be dropped at a location other than the carcass, e.g. on a tray, in a container etc.

A third aspect of the invention relates to a cutting system comprising
- a robot with at least one industrial manipulator, such as a robot arm,
- at least one cutting device as described herein connected to the at least one industrial manipulator.

In some embodiments, the system further comprises at least one vision system for obtaining image data of a carcass in the region of the outside of the anal opening.

In some embodiments, the system further comprises at least one processor for processing obtained image data and configured to compute controlling information based on information including image data.

In some embodiments, the system further comprises at least one control means configured for obtaining at least controlling information from the at least one processor, and for controlling the at least one industrial manipulator such as at least one robot arm and the at least one bung driller to process an animal carcass.

Different items may be included in the bung drilling system as e.g. robot, industrial manipulator, robot arm, vision system, processor and controlling device. Persons skilled in the art are aware of such different systems and the way they should be connected to configure the system to obtain image data, process such data and control the robot or robot arm to process an animal carcass as described herein with a cutting device. The number of axes or degrees of freedom in which the industrial manipulator is capable of working may be dependent on the set up, e.g. whether or not the animal carcass is under transport during the process, e.g. from the time the system starts identifying the location of the anal opening to the time when the cutting device is removed after the drilling process. Thus the industrial manipulator may, dependent on the setup, be an industrial manipulator working in a number of degrees of freedom, the number of degrees of freedom being 1, 2, 3, 4, 5, or 6. Preferred is at least 2 degrees of freedom, such as at least 4 degrees of freedom.

Different information may be obtained from the image data such as information relating the position and size of e.g. the anal opening, the tail, gender etc., which can be included in the image processing and based on which it can be computed where the cutting device is to be positioned to cut around the anal opening and how the industrial manipulator should be controlled.

In an embodiment of the system, the industrial manipulator may be capable of working in e.g. 3 degrees of freedom, such as 5 degrees of freedom, such as being a 6-axis robotic manipulator.

In an embodiment of the system, the system comprises at least one cleaning cabinet for cleaning the cutting device after use. Preferably, such a cleaning cabinet comprises water connection, soap applicator, heating device and/or drying device. Water may be applied in a hot connection through a water connection and hereby heating device and soap applicator may be located outside the cleaning cabinet. The person skilled in the art knows of the requirement of cleaning devices at abattoirs.

In an embodiment of the system, the at least one cleaning cabinet is connected to the at least one industrial manipulator such as a robot arm. Hereby one industrial manipulator or robot arm can hold at least one bung driller and a cleaning cabinet, wherein the cutting device can be cleaned after having been in contact with a carcass.

In an embodiment of the system, at least one industrial manipulator or robot arm comprises at least two cutting devices and at least one cleaning cabinet. In this design one industrial manipulator or robot arm can hold two cutting devices and a cleaning cabinet, wherein one cutting device can be cleaned after having been in contact with a carcass, and such that when one cutting device is cleaned the other cutting device may be in operation.

More than two cutting devices may be located on one industrial manipulator or robot arm, such as e.g. three or four. This may be combined with one, two or three cleaning cabinets.

In an embodiment of the system, two industrial manipulators such as robot arms, each holding at least one cutting device, are included in the system.

In an embodiment of the system, a stationary knife may be located in the system for cutting meat at the ventral side of the anal opening. Such a cut may be performed before removing the bung from the carcass by pulling the cut free bung to the belly side of the carcass.

Features described herein in respect of any of the aspects or figures may be combined with embodiments of other aspects.

BRIEF DESCRIPTION OF THE DRAWINGS

Embodiments of the invention will now be further described with reference to the drawings, in which:

FIGS. 5A-5G illustrate a process for cutting free a rectum end portion of an animal carcass using an embodiment of a cutting device.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
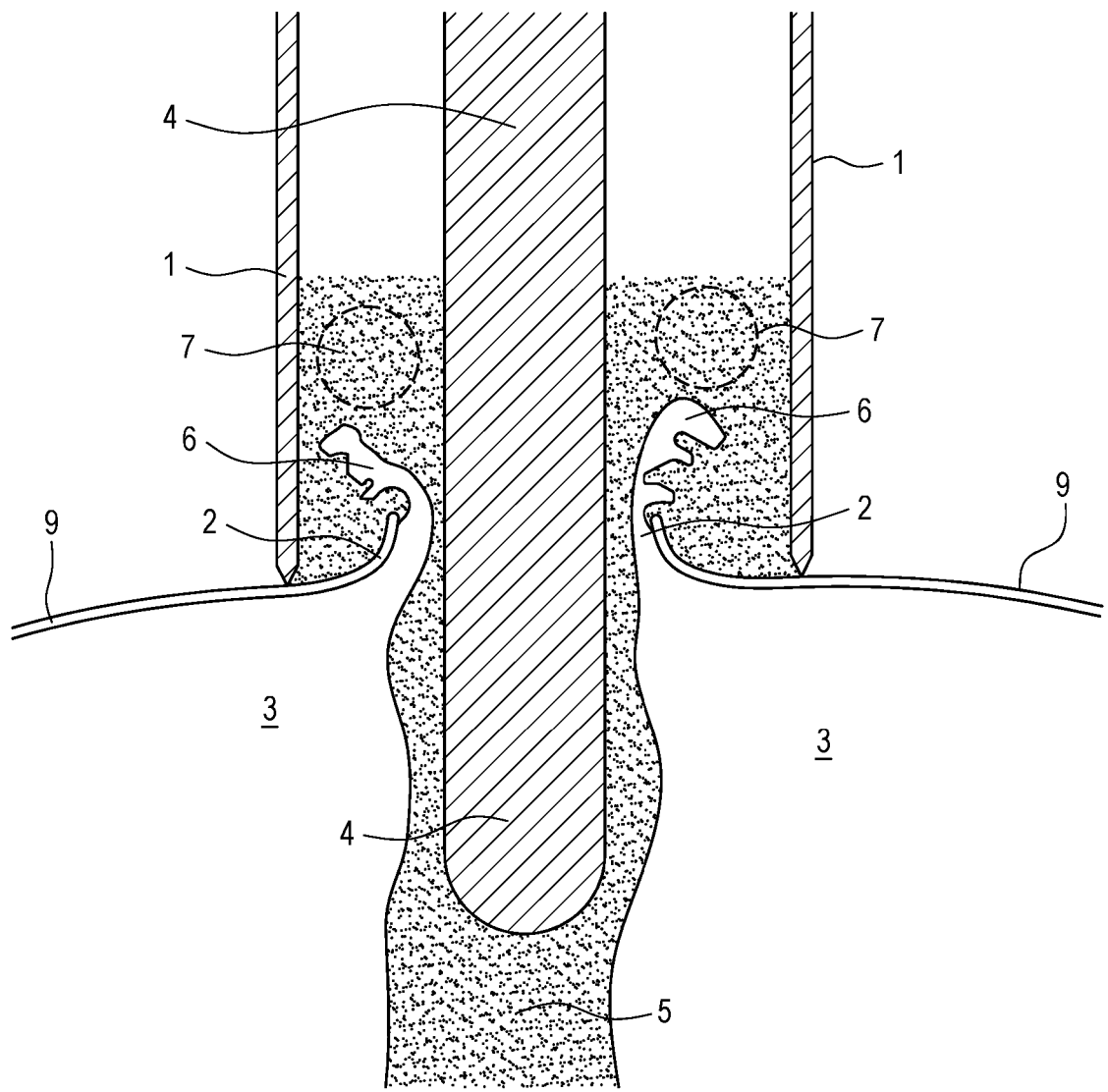
FIG. 1 illustrates a prior art method for bung cutting.

FIG. 1 illustrates a prior art method for bung cutting. A cutting device 1 is located outside and around an anal opening 2 of an animal carcass 3. A leading end of a mandrel 4 of the cutting device 1 has entered the intestines/rectum end 5 of the animal carcass. Inside the cutting device 1, vacuum is established to ensure that the skin 9 of the carcass 3 is not pressed into the carcass 3 by the force applied to the skin 9 by the cutting device 1 during cutting. Normal, i.e. atmospheric pressure, is present on the skin 9 outside of the cutting device 1 and normal pressure is also present inside the carcass 3. Due to the vacuum inside the cutting device 1, the intestinal wall 6 may be sucked into the cutting device 1 and hereby turned inside out and opened, such that feces 7 (illustrated encircled) escapes from the intestine 5 and into the space inside the cutting device 1, where it contaminates the skin 9 located inside the cutting device 1.

Figure 2:
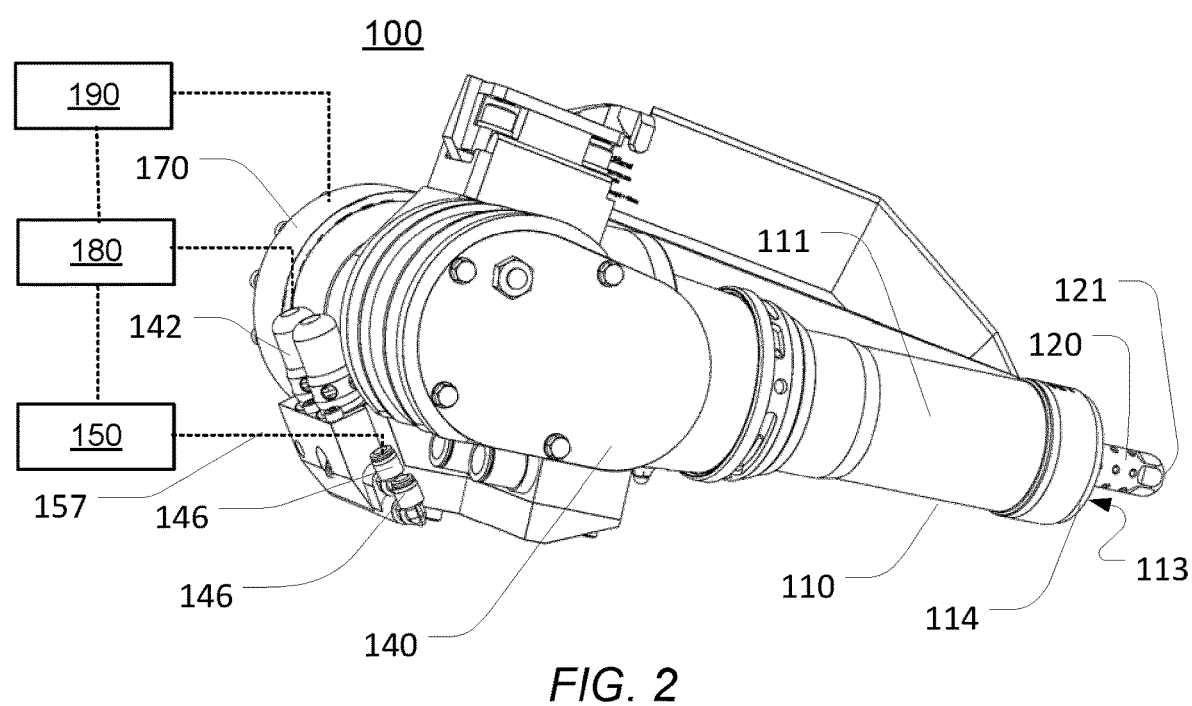
FIG. 2 illustrates an embodiment of a cutting device.

FIG. 2 schematically illustrates an embodiment of a cutting device. The cutting device, generally designated by reference numeral 100, comprises a drilling member 110 having a tubular drilling wall portion 111 defining an interior drilling space. The tubular drilling wall portion 111 has an open cutting end 113. The circumferential edge of the tubular drilling wall portion 111, which defines the open cutting end 113, is formed as a cutting knife 114.

The cutting device 100 comprises a carrying member 140 on which the drilling member 110 is rotatably mounted to allow the drilling member to rotate around its longitudinal axis.

The cutting device 100 of FIG. 2 is configured to be mounted to a robot tool (not illustrated). In particular, the carrying member 140 may be configured to be mounted to a robot-tool, e.g. to a manipulator arm of a robot tool. It will be appreciated, however, that alternative embodiments of a cutting device may be configured to be hand-held. To this end, the carrying member may be shaped and sized so as to be hand-held. Yet further, some embodiments of the cutting device may both be operated in a hand-held mode or mounted on a robot tool.

The carrying member 140 comprises or is operationally coupled to a drive mechanism, e.g. an electrical motor 190, for rotating the drilling member. In the example of FIG. 2, the cutting device comprises a drive gear 170 configured to be operatively connected to a manipulator arm of a robotic cutting system. The drive gear may thus be driven by a drive mechanism of the robotic system.

The cutting device 100 further comprises a centering mandrel 120, which is circumferentially surrounded by the tubular drilling wall portion 111 of the drilling member 110 and arranged coaxial with the drilling member. Accordingly, the mandrel and the tubular drilling wall portion 110 together define an annular space surrounding the mandrel, i.e. an annular portion of the interior drilling space. The mandrel has a leading end 121 configured to be inserted into an anal opening of a carcass.

The cutting device 100 comprises a vacuum pump 150 or other suction means that is fluidly connected, via one or more suitable suction conduits 157, e.g. hoses, pipes and/or other forms of air channels to one or more inlet openings of the interior drilling space, e.g. one or more inlet openings of an interior mandrel space of the mandrel and/or one or more inlet openings of the annular space surrounding the mandrel. The suction means can be accommodated in the carrying member 140 or located remotely from the carrying member. In the latter case, the suction conduits 157 may include one or more connectors 146 on or at the carrying member 140 for detachably coupling the suction means to the carrying member. The carrying members may comprise further connectors, e.g. for compressed air for driving a movable mandrel.

The cutting device 100 further comprises a control unit 180, e.g. a suitably programmed microprocessor a PLC or other suitable electrical control circuit controlling operation of the cutting device. The control circuit may be accommodated in the carrying member 140 or located remotely from the carrying member. In the latter case, the control circuit may be connected to the carrying member via a wired or wireless connection, e.g. a control bus or the like.

The cutting device 100 further comprises one or more controllable venting valves 142 for controlling airflow into the annular space surrounding the mandrel as will be described in greater detail below. The one or more venting valves 142 are operatively coupled to the control means 180 and controlled by the control means 180.

Figure 3:
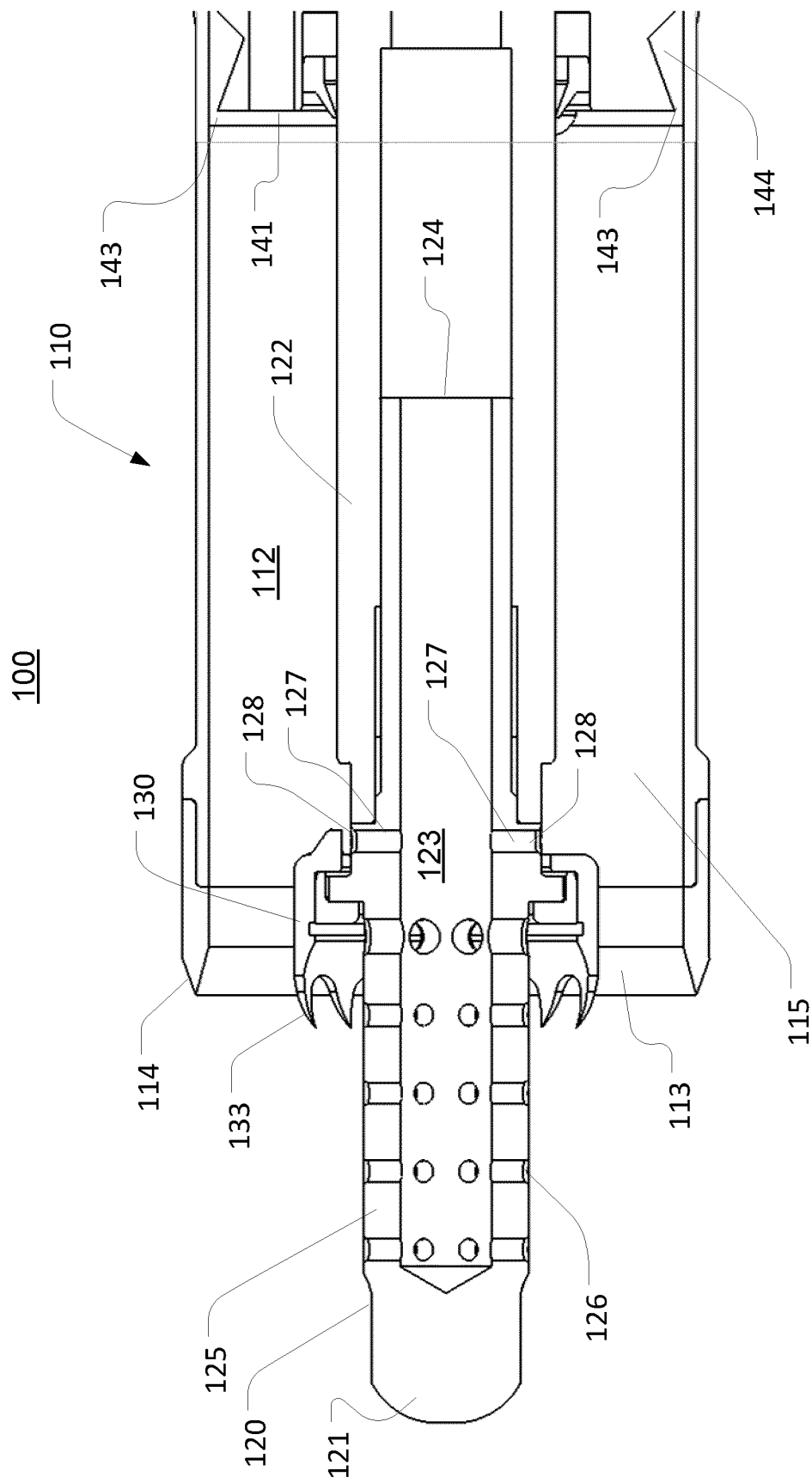
FIG. 3 shows a cross sectional view of a part of an embodiment of a cutting device.

FIG. 3 shows a cross sectional view of a part of an embodiment a cutting device, e.g. of the cutting device of FIG. 2. As mentioned above, the cutting device 100 comprises a drilling member 110 that is rotatably mountable to a carrying member to allow the drilling member to rotate around its longitudinal axis. The drilling member 110 has a tubular drilling wall portion 111 defining an interior drilling space 112. The tubular drilling wall portion 111 has an open cutting end 113. The circumferential edge of the tubular drilling wall portion 111 that defines the open cutting end 113 is formed as a cutting knife 114. The rear end of the drilling member is closed by a rear end wall portion 141.

The cutting device 100 further comprises a centering mandrel 120 which is circumferentially surrounded by the tubular drilling wall portion 111 of the drilling member 110 and arranged coaxial with the drilling member. Accordingly, the mandrel 120 and the tubular drilling wall portion 110 together define an annular space 115 surrounding the mandrel, i.e. an annular portion of the interior drilling space. The mandrel has a leading end 121 configured to be inserted into an anal opening of a carcass.

The cutting device further comprises a bung holder 130, which circumferentially surrounds the mandrel 120 and is circumferentially surrounded by the tubular drilling wall portion 111 of the drilling member 110. The bung holder 130 is formed as a cup-shaped annular member having an open end facing the leading end 121 of the mandrel and a closed end facing the rear end wall portion 141. The bung holder 130 has teeth 133 arranged along a rim of the open end of the cup-shaped bung holder. The teeth are capable of engaging with the skin around an anal opening of a carcass.

The mandrel 120 is axially movable relative to the drilling member 110 between at least an extended position and a retracted position. In FIG. 3, the mandrel 120 is illustrated in its extended position where a leading portion of the mandrel projects out of the open cutting end 113 of the tubular drilling wall portion 111. The leading portion extends axially between the leading end 121 of the mandrel and the bung holder 130. The rear portion 122 of the mandrel extends axially rearwards from the bung holder and into the end wall portion 141. The rear portion 122 is slidably arranged such that it can be retracted through the end wall portion into the carrying member and extended towards the open cutting end 113. For example, the rear portion 122 of the mandrel may be formed as a tubular piston and the leading portion may be removable or permanently connected to the piston.

The bung holder 130 is axially fixed relative to the mandrel 120 such that it is axially movable with the mandrel 120 relative to the drilling member 110 between the extended position and the retracted position. In the extended position illustrated in FIG. 3, the bung holder 130 is generally level with the open cutting end of the drilling member. In the example of FIG. 3, the teeth 133 of the bung holder slightly protrude from the open cutting end. Accordingly, when the leading end 121 of the mandrel is inserted into the anal opening of a carcass, the teeth 133 can engage the skin surrounding the anal opening just before the cutting knife 114 starts cutting into the skin. In the retracted position (not shown in FIG. 3), the bung holder is positioned proximal the end wall portion 141 and the leading end 121 of the mandrel is retracted inside the interior drilling space 112.

The mandrel 120 may be rotatable around its longitudinal axis relative to the carrying member 140 or it may be rotationally fixed relative to the carrying member. Similarly, the bung holder 130 may be rotatable relative to the mandrel 120 or it may be rotationally fixed relative to the mandrel. Preferably, the bung holder 130 is configured such that, during operation, the bung holder does not rotate relative to the skin surrounding the carcass when the rotating drilling member 110 cuts into the carcass.

The mandrel 120 has a mandrel wall portion 125 defining an interior mandrel space 123. The interior mandrel space 123 extends axially between the leading portion and the rear portion of the mandrel. At least a portion of the interior mandrel space, in particular the rear portion of the interior mandrel space that does not protrude out of the open cutting end, constitutes a part of the interior drilling space. The rear portion 122 of the mandrel 120 has an inlet opening 124. The inlet opening 124 is configured to provide fluid communication between the interior mandrel space 123 and a suction means (not explicitly shown in FIG. 3, see e.g. suction means 150 of FIG. 2), e.g. a vacuum pump, configured to apply rearward suction to the interior mandrel space 123 through inlet opening 124. Other embodiments may include more than one inlet openings and/or an inlet opening located at a different location of the mandrel. The mandrel wall portion 125 of the mandrel 120 comprises suction openings 126 arranged around the circumference of the leading portion of the mandrel 120, i.e. the portion extending between the leading end 121 and the bung holder 130. Accordingly, when the leading portion of the mandrel extends into the anal opening of a carcass and when suction is applied to the interior mandrel space 123 via the inlet opening 124, radially inward suction is applied through the suction openings 126 causing the intestine wall to be sucked radially inward so as to snuggly surround the mandrel. It will be appreciated that different embodiments may include a different number of suction openings and/or suction openings arranged in a different manner along or around the leading portion of the mandrel.

The mandrel 120 further comprises connecting conduits 127 providing fluid communication between the annular space 115 surrounding the rear portion 122 of the mandrel and the interior mandrel space 123. Accordingly, when suction is applied to the interior mandrel space 123 via the inlet opening 124, suction is also applied to the annular space 115 via the connecting conduits 127 towards the interior mandrel space 123.

The connecting conduits 127 are positioned in the rear portion 122 of the mandrel adjacent the bung holder 130, i.e. immediately rearward of the bung holder 130. Accordingly, the connecting conduits 127 have openings 128 into the interior drilling space 112 regardless of whether the mandrel is in its extended position or in its retracted position. When the mandrel 120 is in its retracted position (not shown in FIG. 3), the openings 128 of the connecting conduits 127 are axially positioned in the rear end of the interior drilling space 112 immediately in front of the end wall portion 141. In the example of FIG. 3, two connecting conduits are shown. However, it will be appreciated that other embodiments may be provided with only a single connecting conduit or with more than two connecting conduits, such as 3, 4, 5 or even more connecting conduits. Different embodiments may thus include a different number of connecting conduits or conduits being located at a different position.

The end wall portion 141 of the carrying member comprises venting openings 143 fluidly connected to a common venting valve or to respective venting valves (not shown in FIG. 3, see e.g. venting valve 142 of FIG. 2) configured to selectively allow air to enter the annular space 115 through the venting openings 143 and to selectively prevent air from entering the annular space 115 through the venting openings 143. Generally, the cutting device 100 may include one or more venting valves, each controlling one or more venting openings. In the example of FIG. 3, the venting openings are provided as small channels between the end wall portion 141 and the tubular drilling wall portion 111. The channels are connected to an annular channel 144 which in turn is fluidly connected via the controllable valve 142 (see FIG. 2) and suitable venting conduits to the outside atmosphere and/or another source of air that is not contaminated by feces or the like.

Figure 4:
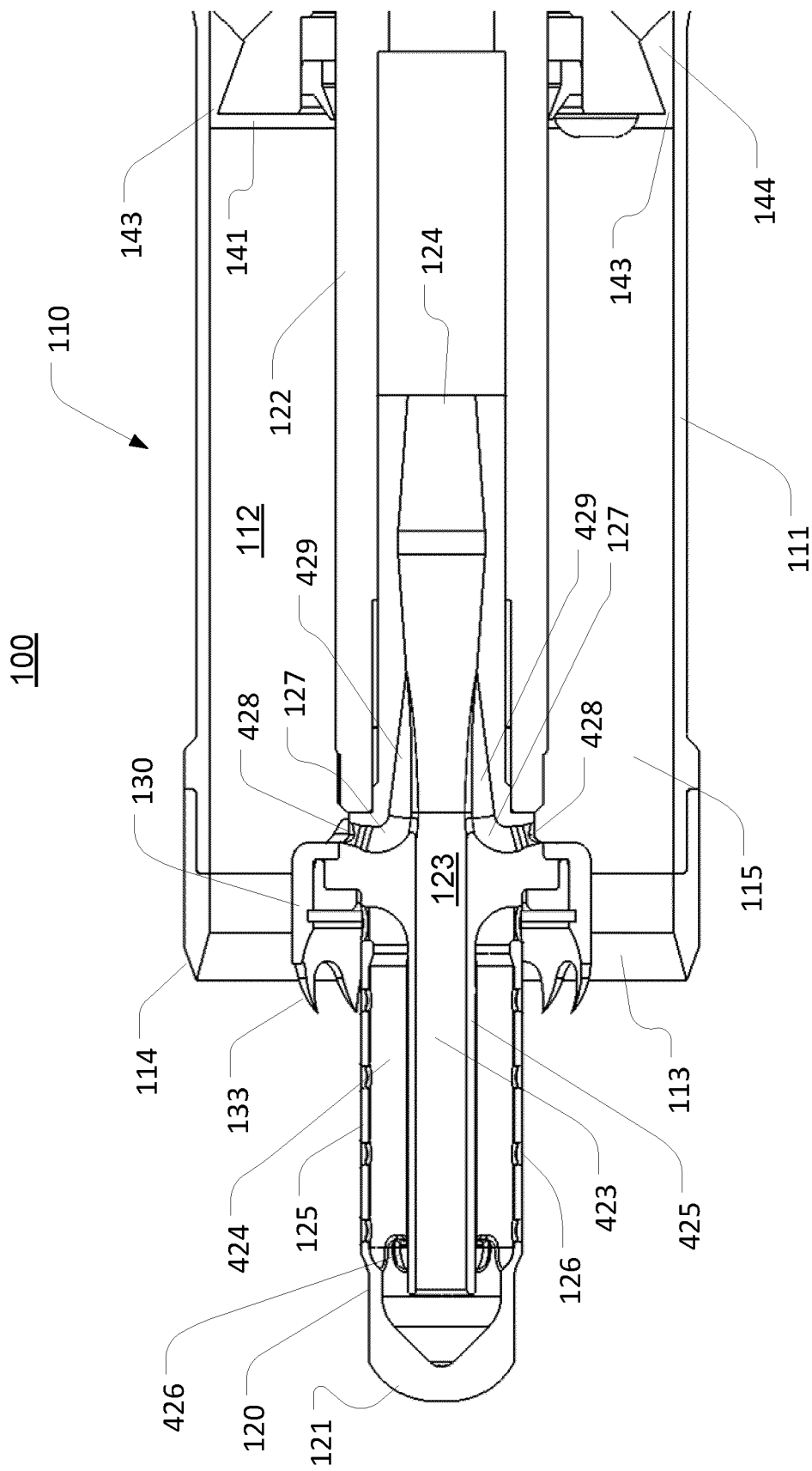
FIG. 4 shows a cross sectional view of a part of another embodiment of a cutting device.

FIG. 4 shows a cross sectional view of a part of another embodiment a cutting device, e.g. of the cutting device of FIG. 2. The embodiment of FIG. 4 is similar to the embodiment of FIG. 3 in that it comprises a drilling member 110 that is rotatably mountable to a carrying member to allow the drilling member to rotate around its longitudinal axis, a centering mandrel 120 which is circumferentially surrounded by the tubular drilling wall portion 111 of the drilling member 110 and arranged coaxial with the drilling member, and a bung holder 130 which circumferentially surrounds the mandrel 120 and is circumferentially surrounded by the tubular wall portion 111 of the drilling member 110, all as described in connection with FIG. 3 except for the following modification of the mandrel:

As in the embodiment of FIG. 3, the mandrel 120 of the embodiment of FIG. 3 has a mandrel wall portion 125 defining an interior mandrel space 123. However, in the embodiment of FIG. 4, the interior mandrel space 123 includes an inner tubular portion 423 and an outer portion 424 circumferentially surrounding the inner tubular portion. The inner tubular portion 423 extends axially between the leading end 121 of the mandrel and the rear portion 122 of the mandrel and is coaxial with the mandrel 120. The rear portion 122 of the mandrel 120 has an inlet opening 124. The inlet opening 124 is configured to provide fluid communication between the inner tubular portion 423 of the interior mandrel space 123 and a suction means (not explicitly shown in FIG. 3, see e.g. suction means 150 of FIG. 2), e.g. a vacuum pump, configured to apply rearward suction to the inner tubular portion 423 of the interior mandrel space 123 through inlet opening 124. Other embodiments may include more than one inlet openings and/or an inlet opening located at a different location of the mandrel.

The outer portion 424 of the interior mandrel space is arranged radially outward relative to the inner tubular portion and is radially separated from the inner tubular portion by a dividing wall 425. The outer portion 424 may be provided as an annular space completely surrounding the inner tubular portion. Alternatively, the outer portion may be provided as a plurality of elongated channels, each extending axially alongside the inner tubular portion. The elongated channels may be distributed around the circumference of the inner tubular portion. The outer portion 424, e.g. the annular space or each of the channels, is fluidly connected to the inner tubular portion 423 by one or more openings 426 arranged proximal to the front end of the inner tubular portion, i.e. proximal to the leading end 121 of the mandrel. This way, it is ensured that strong suction can be applied, and efficient cleaning is facilitated, all the way to the leading end of the mandrel. The outer portion 424 of the interior mandrel space extends axially between the leading end 121 of the mandrel to the bung holder 130.

The mandrel wall portion 125 of the mandrel 120 comprises suction openings 126 arranged around the circumference of the leading portion of the mandrel 120, i.e. the portion extending between the leading end 121 and the bung holder 130, as described in connection with FIG. 3. However, in the embodiment of FIG. 4, the suction openings 126 feed into the outer portion 424 of the interior mandrel space, i.e. any air or contaminants sucked into the mandrel through the suction openings 126 flow forward through the outer portion 424 towards the leading end 121 of the mandrel, then radially inward into the inner tubular portion 423 and rearward through the inner tubular portion 423 to the inlet opening 124.

The mandrel 120 further comprises connecting conduits 127 providing fluid communication between the annular space 115 surrounding the rear portion 122 of the mandrel and the inner tubular portion 423 of the interior mandrel space 123. In this example, the conduits have a curved shape. They have a radially inward and slightly forward directed inlet portion 428 for receiving airflow from the annular space 115. They further have a rearward and slightly radially inward outlet portion 429 feeding the airflow rearward and slightly radially inward into the inner tubular portion 423 of the interior mandrel space. As in the example of FIG. 3, the connecting conduits 127 are positioned in the rear portion 122 of the mandrel adjacent the bung holder 130, i.e. immediately rearward of the bung holder 130. In an alternative embodiment, the connecting conduits 127 may provide fluid communication between the annular space 115 surrounding the rear portion 122 of the mandrel and the outer portion 424 of the interior mandrel space 123.

Operation of an embodiment of a cutting device, e.g. of any of the embodiments of FIGS. 2-4, will now be described with reference to FIGS. 5A-5G. In particular, FIGS. 5A-5G schematically illustrate a part of the cutting device during different stages of the process of cutting free the rectum end portion of a carcass. For ease of illustration, FIGS. 5A-5G show a less detailed view of the cutting device. It will be appreciated, however, that the cutting device of FIGS. 5A-5G may have some or even all of the same features as have been described above with reference to any of FIGS. 2-4.

Figure 5A:
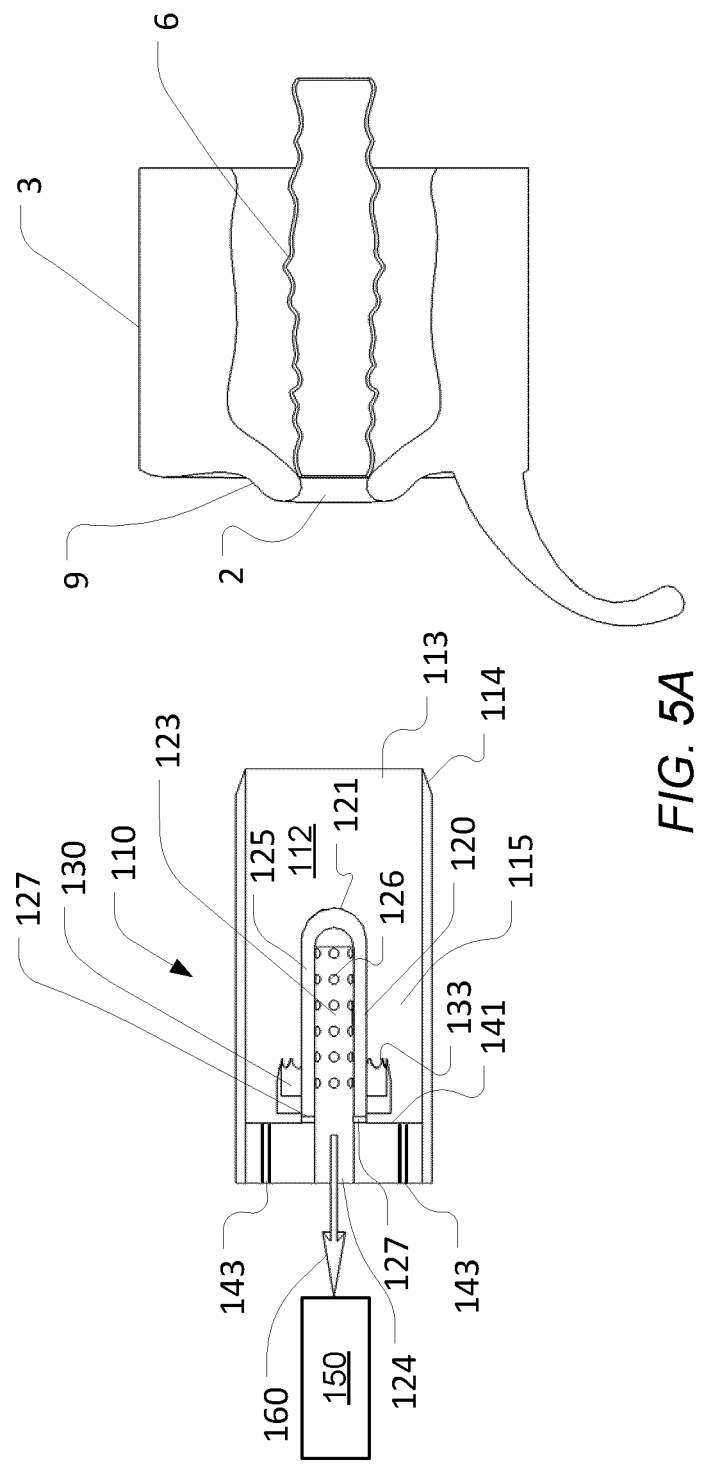

FIG. 5A illustrates a longitudinal cross sectional cut through a portion of the cutting device with the mandrel 120 in its retracted position. In particular, the cutting device comprises a carrying member (not explicitly shown in FIGS. 5A-5G), a drilling member 110 rotatably mounted on the carrying member, a centering mandrel 120, a bung holder 130 and suction means 150, e.g. a vacuum pump, all as described in connection with FIG. 2.

The drilling member 110 comprises a tubular drilling wall portion 111 surrounding an interior drilling space 112. The tubular drilling wall portion has an open cutting end 113 defined by an edge of the tubular drilling wall portion that is formed as a cutting knife 114.

The centering mandrel 120 is arranged coaxial with the tubular drilling wall portion 111 and has a leading end 121, which is configured to enter the rectum of the carcass. At least a portion of the mandrel is circumferentially surrounded by the tubular drilling wall portion so as to define an annular space 115 surrounding the mandrel. The mandrel has a circumferential mandrel wall portion that defines an interior mandrel space 123 which has a rearward inlet opening 124. The mandrel comprises connecting conduits 127 providing fluid communication between the annular space 115 and the interior mandrel space 123.

The drilling member 110 further comprises one or more venting openings 143 in a rear wall portion 141 of the drilling member for selectively allowing air to enter the annular space 115. In the example of FIGS. 5A-5G, two such venting openings are shown. It will be appreciated, however, that other embodiments may include only a single venting opening or more than two venting openings. Similarly, airflow through each venting opening may be individually controlled by a corresponding venting valve (not shown in FIGS. 5A-5G) or one or more valves may control airflow through multiple venting openings.

The suction means 150 may be a vacuum pump or other device configured for applying suction to the interior mandrel space 123 through the reward inlet opening 124, as illustrated by arrow 160. Accordingly, the suction means also applies suction to the annular portion of the interior drilling space 112 via the connecting conduits 127.

The bung holder 130 is an annular cup-shaped element surrounding the mandrel. The bung holder has a forward facing open end with forward-facing teeth 133 arranged along its circumference.

In FIG. 5A, the cutting device 100 is shown outside and in front of a rectum end portion of a carcass 3 with the open cutting end 113 of the drilling member facing the anal opening 2, prior to initiating the cutting process.

Figure 5B:
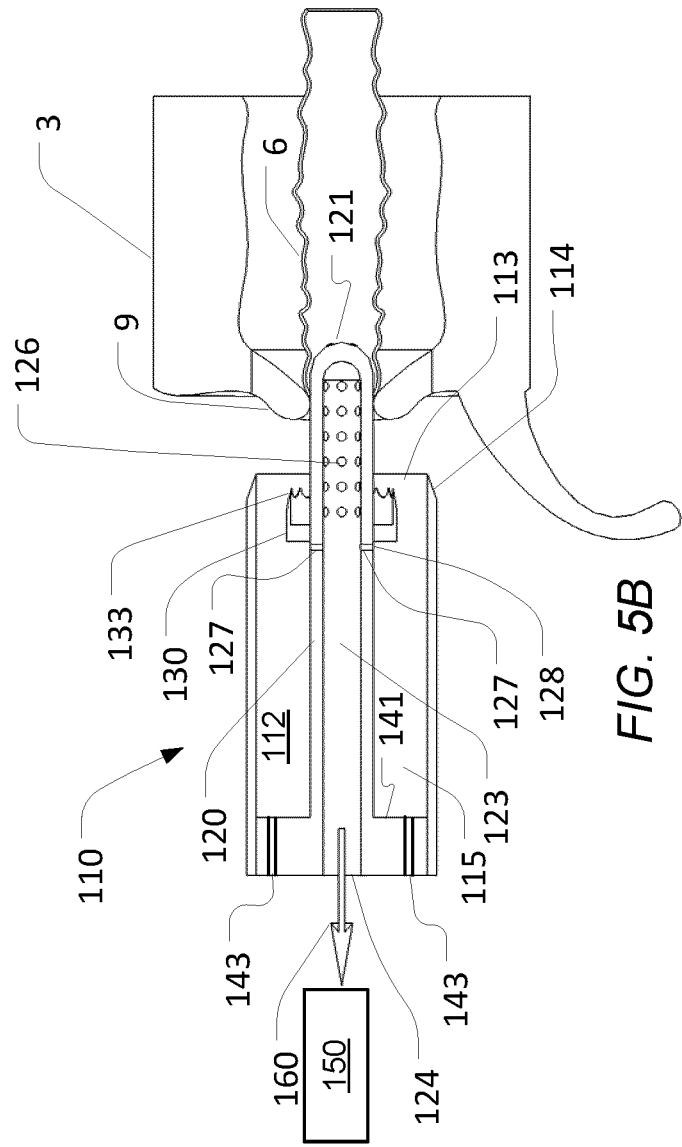

The cutting process is initiated by axially moving the mandrel 120 to its extended position and by inserting the leading end 121 of the mandrel 120 into the anal opening 2, as illustrated in FIG. 5B. In particular, FIG. 5B illustrates the cutting device with the mandrel 120 in its extended position. In this position the cutting device 100 is ready to be inserted into an anal opening of a carcass, where the leading portion of the mandrel 120, which is located outside i.e. in front of the drilling member 110 is inserted into the anal opening 2. The initial insertion of the mandrel 120 into the anal opening 2 may be performed while the suction means 150 applies suction to the interior mandrel space 123, as illustrated by arrow 160 in FIG. 5B. Alternatively, the initial insertion of the mandrel into the anal opening may be performed without any suction or with only reduced suction applied.

The teeth 133 of the bung holder 130 are in a position ready to engage with the skin surface around the anal opening of a carcass. In the example of FIG. 5B, the teeth are axially positioned slightly rearward of the cutting knife 114. However, in other embodiments, the teeth may slightly extend out of the drilling member or be level with the cutting knife 114.

FIG. 5C illustrates the cutting device with the mandrel inserted deeper into the anal opening of the carcass and with the teeth 133 of the bung holder 130 having engaged the skin surrounding the anal opening. When suction is applied by the suction means 150 to the interior mandrel space 123 and, via the connecting conduits 127, to the annular space 115, the skin and tissue surrounding the anal opening are sucked rearwards toward the open cutting end 113 of the drilling member 110, thus preventing outside air to enter the interior drilling space 112 through the open cutting end 113. Similarly, the intestine wall 6 is sucked radially inward and blocks the suction openings 126 in the leading portion of the mandrel 120. Yet further, during this stage of the cutting process, the venting valve is closed so as to prevent air from entering the annular space 115 through the venting openings 143. Accordingly, the suction means 150 creates a vacuum in the interior drilling space 123, in particular in the interior mandrel space 123 and in the annular space 115 surrounding the mandrel 120.

As is illustrated in FIG. 5C, as the skin and tissue surrounding the anal opening is sucked towards the open cutting end 113 of the drilling member 110, the skin and tissue also close the forward-facing open end of the bung holder 130, thus creating a bung holder volume 134 inside the bung holder 130, where a vacuum can be established by the suction means 150 via one or some of the suction openings 126 in the leading portion of the mandrel 120.

It will be appreciated that, in other embodiments, the suction means may be configured to apply additional and/or alternative suction directly to the annular space and/or the bung holder volume inside the bung holder, e.g. via suitable openings and/or air conduits in the carrying member, the mandrel, the drilling wall portion, and/or the bung holder.

The cutting knife 114 of the drilling member 110 is now in a position where it can begin cutting into the carcass around the anal opening and rectum end. Cutting is performed by rotating the tubular drilling wall portion 111 around its longitudinal axis by means of a motor (not shown) or other drive means while further advancing the drilling device deeper into the carcass and while continuing to apply suction to the interior mandrel space 123 by the suction means 150. During this process, the mandrel 120 is gradually retracted rearwards relative to the drilling member into the interior drilling space 112. This movement may be caused by actively actuating the mandrel rearwards in an axial direction, e.g. by means of a pneumatic piston. Alternatively, the slidable mandrel may simply be pushed back due to the suction force pulling the skin and tissue surrounding the anal opening rearward, which in turn pushes the bung holder 130 and mandrel 120 rearward.

A first function of the bung holder 130 is to perform a force to the outside of the skin 9 such that the edge of the anal opening i.e. the intestine wall 6 close to the anal opening does not turn inside out and let amounts of fecal matter escape from the intestine/rectum end by passing by the tip 121 of the mandrel 120 and out through the anal opening. A second function of the bung holder 130 is to keep fecal matter, which may anyway have escaped through the anal opening, inside the bung holder volume 134 such that the skin 9 area which may be contaminated by fecal matter is very much reduced compared to prior art systems. Accordingly, during the cutting, the bung holder 130 acts to prevent the interior intestine wall to be sucked rearwards through the anal opening, thus also reducing the risk of contaminants from the inside of the rectum to be sucked out of the anal opening and into the annular space 115.

Figure 5D:
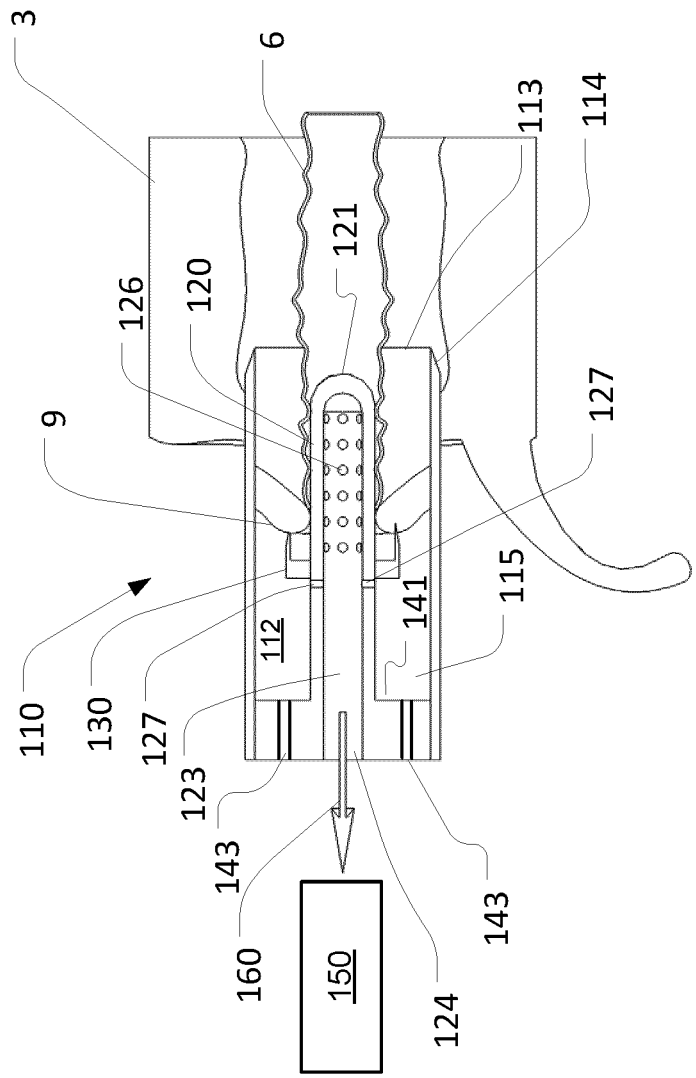

FIG. 5D illustrates the cutting device during the cutting process with the drilling member 110 having penetrated the skin and tissue surrounding the anal opening of the carcass and with the mandrel 120 and bung holder 130 being partly retracted rearwards into the interior drilling space 112 of the drilling member 110. Moreover, skin and tissue that has been cut loose have been sucked rearwards into the drilling member 110.

Figure 5E:
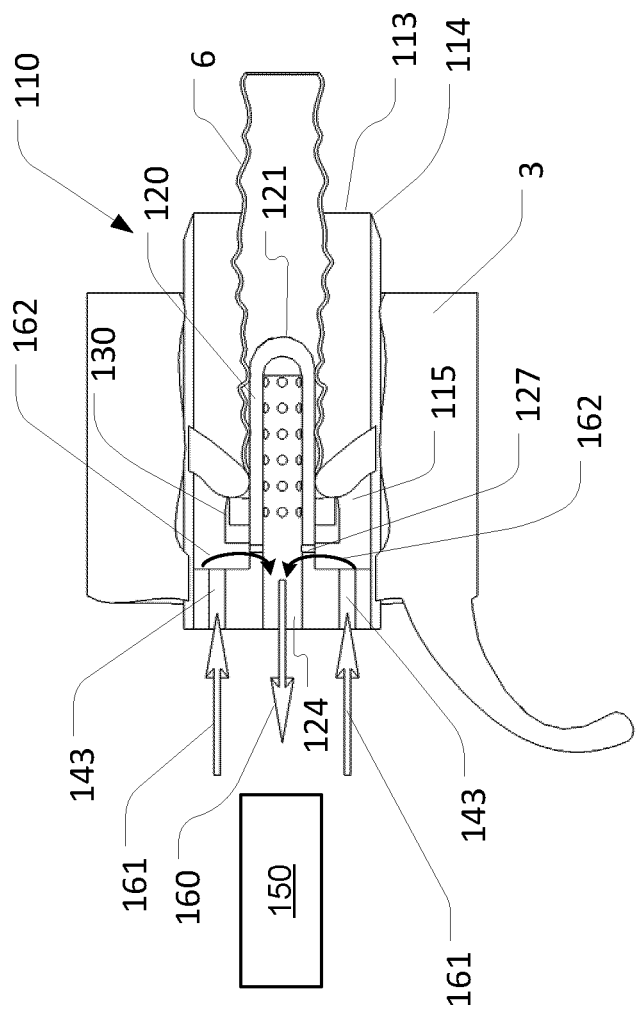

FIG. 5E illustrates the cutting device 100 yet more deeply advanced into the carcass and having cut free the rectum end portion of the carcass. At this stage, the mandrel 120 is in its retracted position and the openings 128 or the connecting conduits 127 are positioned in the rear end of the interior drilling space 112.

When the cutting has been completed and the drilling member is to be withdrawn again from the carcass, the venting valves of the cutting device are opened so as to allow air to enter the annular space 115 through the venting openings 143, as illustrated by arrows 161. Accordingly, the vacuum inside the drilling member is released, or at least significantly reduced, and the skin and tissue inside the drilling member can be pulled back out of the drilling member by the elastic intestine wall 6 when the cutting device is withdrawn from the carcass. Moreover, the suction means 150 continues to apply suction to the interior mandrel space as illustrated by arrow 160, thus causing an airflow through the venting openings 143 into the annular space 115 and further through the connecting conduits 127 into the interior mandrel space 123 and rearwards out of the interior mandrel space through the inlet opening 124, as illustrated by arrows 162. The air allowed to enter by the venting valves may be ambient air at atmospheric pressure. Alternatively, the air may be compressed air or otherwise air at controlled pressure or even air actively pumped into the interior mandrel space 123 through venting openings 143. This airflow 162 can carry some or even all contaminants that may have entered the annular space 115 out of the drilling member. In particular, as explained above, the bung holder 130 reduces the risk of such contaminants entering the annular space 115 from the inside of the intestine during the cutting. Nevertheless, some contaminants may still enter the annular space 115. Flushing out these contaminants from the annular space 115 by the created airflow 162 during withdrawal of the drilling member from the carcass thus further reduces the risk of contaminants being left behind on the outside of the carcass after completion of the cutting process.

FIG. 5F illustrates the cutting device after it has partly been withdrawn from the carcass 3. In particular, the cut-loose tissue has been dropped from the mandrel 120 and bung holder 130 by the elastic forces of the intestine walls 6. The continued suction 160 while venting the annular space 115 via venting openings 143 flushes some or all of any remaining contaminants from the annular space 115 and from the interior mandrel space 123 out of the drilling member and prevents them from being dropped into the carcass 3 when withdrawing the cutting device.

It will be appreciated that, in some embodiments, different flow directions may be established for the airflow between a venting opening and an inlet opening during continued suction when withdrawing the drilling device from the carcass, e.g. by varying the locations of the openings in the leading end of the mandrel, the location of the venting and/or inlet opening and/or the location of the connecting conduits. It will further be appreciated that, alternatively to dropping the cut free rectum end into the cut hole, the cut-free rectum end may also be initially withheld inside the drilling member by means of the vacuum and the rectum end positioned outside the cut hole.

Figure 5G:
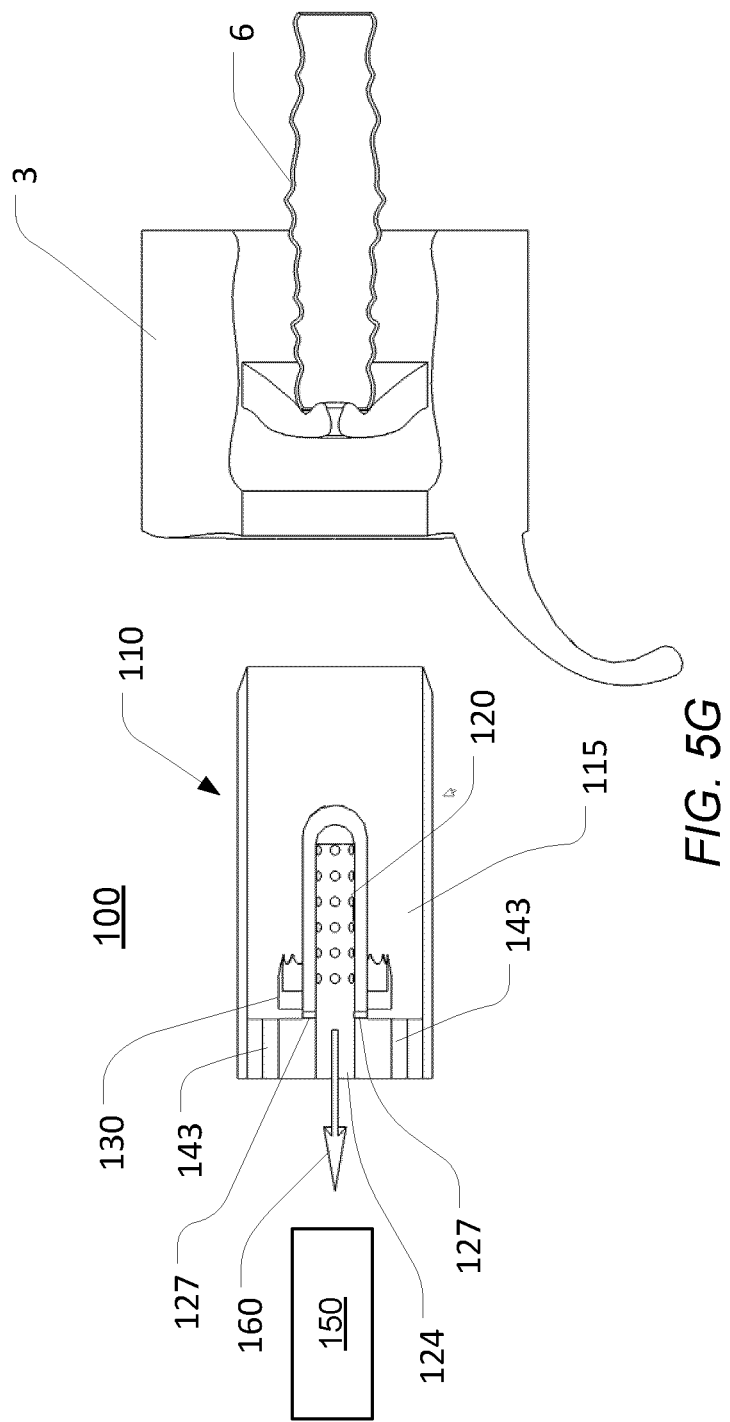

FIG. 5G illustrates the cutting device after it has been completely withdrawn from the carcass 3.

FIGS. 6A-6E schematically illustrate another embodiment of a cutting device and its operation. The cutting device of FIGS. 6A-6E is similar to the cutting device of FIGS. 2-4 and 5A-5G in that it comprises a drilling member 110 rotatably mounted on a carrying member (not explicitly shown in FIGS. 6A-6E), a centering mandrel 120, and suction means 150, e.g. a vacuum pump.

The drilling member 110 comprises a tubular drilling wall portion 111 surrounding an interior drilling space 112. The tubular drilling wall portion has an open cutting end 113 defined by an edge of the tubular drilling wall portion that is formed as a cutting knife 114. The centering mandrel 120 is arranged coaxially with the tubular drilling wall portion 111 and has a leading end 121, which is configured to enter the anal opening 2 of the carcass 3. At least a portion of the mandrel 120 is circumferentially surrounded by the tubular drilling wall portion 111 so as to define an annular space 115 surrounding the mandrel. The mandrel 120 has a circumferential mandrel wall portion 115 that defines an interior mandrel space 123, which has a rearward inlet opening 124. The mandrel comprises one or more connecting conduits 127 providing fluid communication between the annular space 115 and the interior mandrel space 123. The one or more connecting conduits 127 are located in the rear end of the interior drilling space 112 adjacent an end wall portion 141 of the drilling member. The mandrel 120 further comprises one or more suction openings 126 in its circumferential wall 125. The one or more suction openings 126 are located proximal to the leading end 121 of the mandrel 120. It will be appreciated that, in some alternative embodiments, the one or more suction openings may be positioned elsewhere or even omitted. Alternatively or additionally, in some embodiments the one or more connecting conduits may be positioned elsewhere or even omitted. In such embodiments, the cutting device may comprise a separate inlet opening to allow the suction means to apply suction directly to the annular space.

The cutting device further comprises venting valves 142, which may be accommodated in the carrying member, configured to selectively allow air to enter the annular space 115 through venting openings 143 and to selectively prevent air from entering the annular space 115 through the venting openings 143.

The suction means 150 may be a vacuum pump or other device configured for applying suction to the interior mandrel space 123 through the reward inlet opening 124, as illustrated by arrow 160. Accordingly, the suction means also applies suction to the annular portion 115 of the interior drilling space 112 via the connecting conduits 127.

The mandrel of the cutting device of FIGS. 6A-6E is arranged axially fixed relative to the drilling member 110, with its leading end 121 extending out of the open cutting end 113. The cutting device of FIGS. 6A-6E further differs from the cutting devices of FIGS. 3-4 and 5A-5G in that the cutting device of FIGS. 6A-6E does not have a bung holder.

Figure 6A:
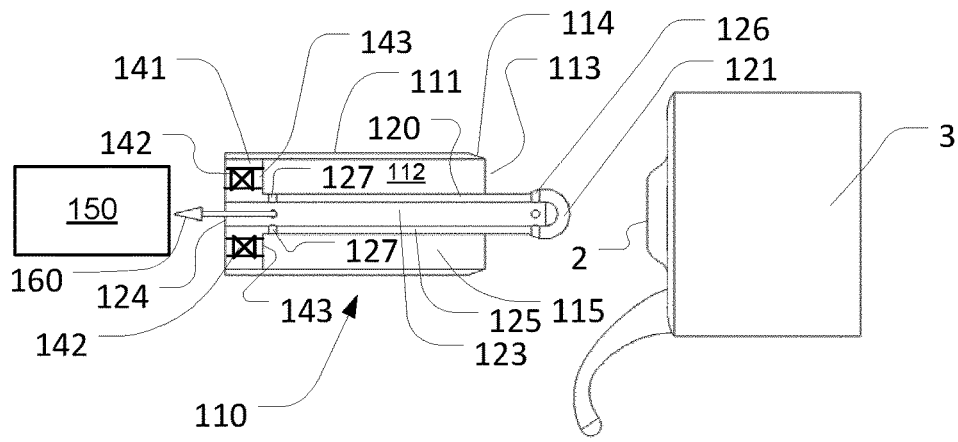
FIGS. 6A-6E illustrate a process for cutting free a rectum end portion of an animal carcass using yet another embodiment of a cutting device.

FIG. 6A illustrates a longitudinal cut through the cutting device positioned in front of the anal opening 2 of a carcass 3 with the leading end 121 of the mandrel 120 facing the anal opening 2. In this position the cutting device is ready to start cutting out the rectum end portion of the carcass 3. The suction means 150 is activated and applies suction to the interior mandrel space 123 via inlet opening 124. Accordingly, the suction means 150 also applies suction to the annular space 115 via the connecting conduits 127 as well as suction at the suction openings 126. Alternatively, the initial insertion of the mandrel into the anal opening may be performed without any suction or with only reduced suction applied.

Figure 6B:
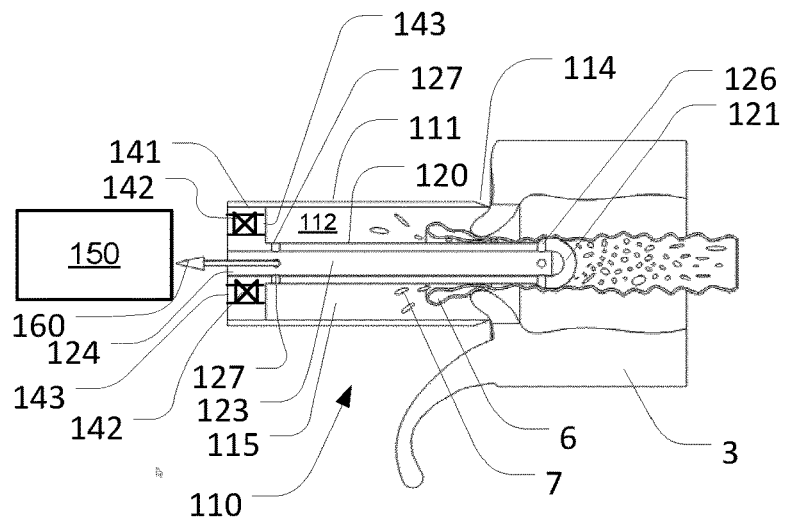

The cutting process is initiated by inserting the leading end 121 of the mandrel 120 into the anal opening 2, as illustrated in FIG. 6B. In particular, FIG. 6B illustrates the cutting device with the mandrel 120 inserted into the anal opening of the carcass. When suction is applied by the suction means 150 to the interior mandrel space 123 and, via the connecting conduits 127, to the annular space 115, the skin and tissue surrounding the anal opening are sucked rearwards toward the open cutting end of the drilling member. Similarly, the intestine wall is sucked radially inward and blocks the openings 126 in the leading portion of the mandrel. Yet further, during this stage of the cutting process, the venting valve 142 is closed so as to prevent air to enter the annular space 115 through the venting openings 143. Accordingly, the suction means 150 creates a vacuum in the interior drilling space 112, in particular in the interior mandrel space 123 and in the annular space 115 surrounding the mandrel 120. The suction may cause part of the intestine wall 6 to bulge out of the anal opening and into the interior drilling space 112. This may also cause small amounts of contents of the intestines to be sucked as contaminants 7 into the interior drilling space 112.

The cutting knife 114 of the drilling member 110 is now in a position where it can begin cutting into the carcass around the anal opening and rectum end. Cutting is performed by rotating the tubular drilling wall 111 around its longitudinal axis by means of a motor (not shown) while further advancing the drilling device into the carcass 3 and while continuing to apply suction to the interior mandrel space 123 by the suction means 150.

Figure 6C:
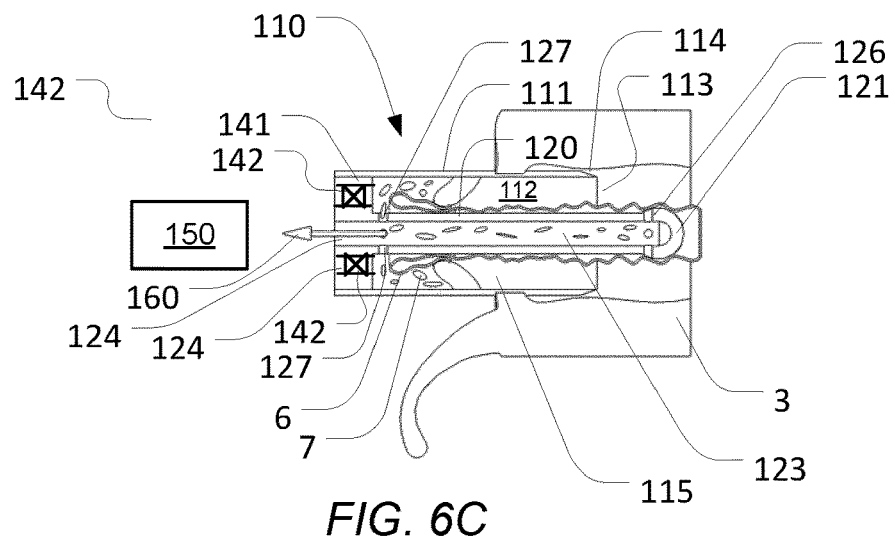

FIG. 6C illustrates the cutting device where the drilling member 110 has penetrated the skin and tissue surrounding the anal opening of the carcass and with the mandrel 120 further advanced into the anal opening. Moreover, skin and tissue that has been cut loose have been sucked rearwards into the drilling member 110. The contaminants 7 having escaped from the anal opening are likewise sucked towards the rear end of the interior drilling space 112 and some of the contaminants are sucked through the connecting conduits 127 and the inlet opening 124 out of the cutting device. Likewise, at least some of the contaminants that may have been sucked into the interior mandrel space 123 through the openings 126 while the mandrel advances further into the carcass are sucked through inlet opening 124 out of the cutting device.

Figure 6D:
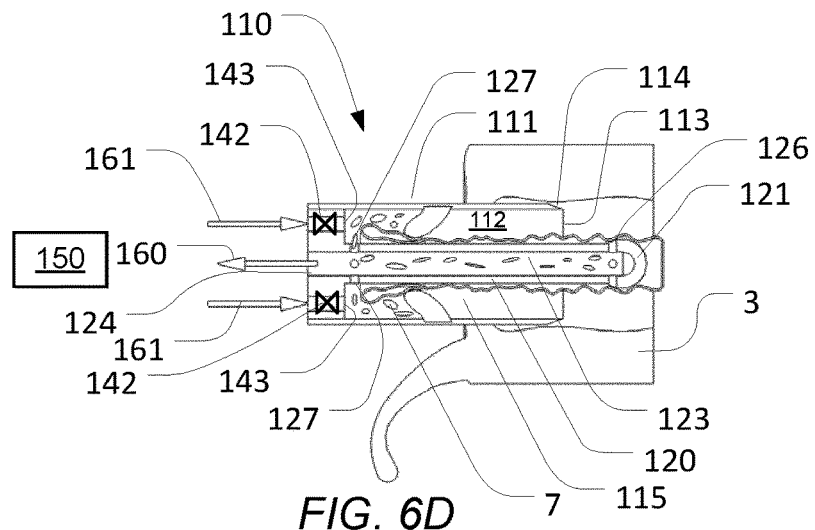

When the cutting has been completed and the cutting device is about to be withdrawn from the carcass again, the venting valves 142 are opened, as illustrated in FIG. 6D. In particular, FIG. 6D illustrates the cutting device after the rectum end of the carcass has been cut loose and where the venting valves 142 have been opened so as to allow air to enter the annular space 155 through venting openings 143, as illustrated by arrows 161. Accordingly, the vacuum inside the drilling member is released, or at least significantly reduced, and the skin and tissue inside the drilling member can be pulled out by the elastic intestine wall when the cutting device is withdrawn from the carcass.

Moreover, as in the embodiment described with reference to FIGS. 5A-5G, the suction means 150 continues to apply suction to the interior mandrel space 123 as illustrated by arrow 160, thus causing an airflow through the venting openings 143 into the annular space 115 and further through the connecting conduits 127 into the interior mandrel space 123 and rearwards out of the interior mandrel space through the inlet opening 124. This airflow can carry some or even all remaining contaminants that may have entered the annular space out of the cutting device through inlet opening 124.

Figure 6E:
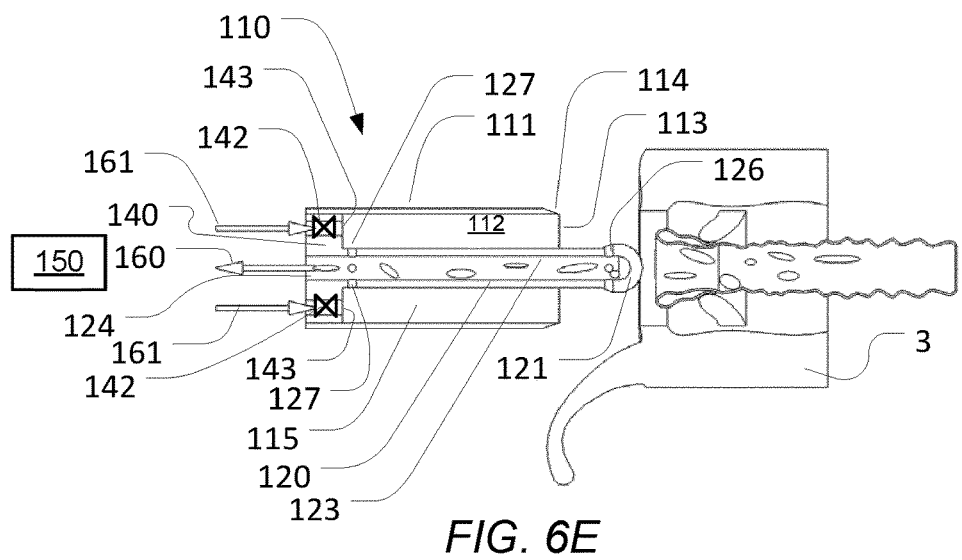

FIG. 6E illustrates the cutting device after it has been withdrawn from the carcass. In particular, the cut-loose tissue has been dropped from the mandrel by the elastic forces of the intestine walls. The continued suction 160 while venting the annular space 155 via venting openings 143 flushes most or even all remaining contaminants from the annular space 115 and prevents them from being dropped into the carcass when withdrawing the cutting device.

In the examples of FIGS. 5A-5G and 5A-6E, the venting valves are controlled to only allow airflow through the one or more venting openings after the rectum end portion of the carcass has been cut free. Generally, in some embodiments, the cutting device may also allow airflow into the interior drilling space through the venting openings during the cutting process. In some embodiments, the cutting device may allow no, or only a reduced airflow, to enter the interior drilling space through the venting openings while the drilling member cuts into the carcass so as to allow the suction means to create a sufficient vacuum in the interior drilling space. After the rectum end portion has been cut free, when the rectum end portion is released from the interior drilling space through the open cutting end, e.g. during and/or after withdrawal of the cutting device from the carcass, the cutting device may be configured to allow airflow—or allow an increased airflow, larger than the reduced airflow—into the interior drilling space through the one or more venting openings while continuing to apply suction through the one or more inlet openings, thus facilitating an efficient cleaning out of contaminants from the interior drilling space.

Figure 7:
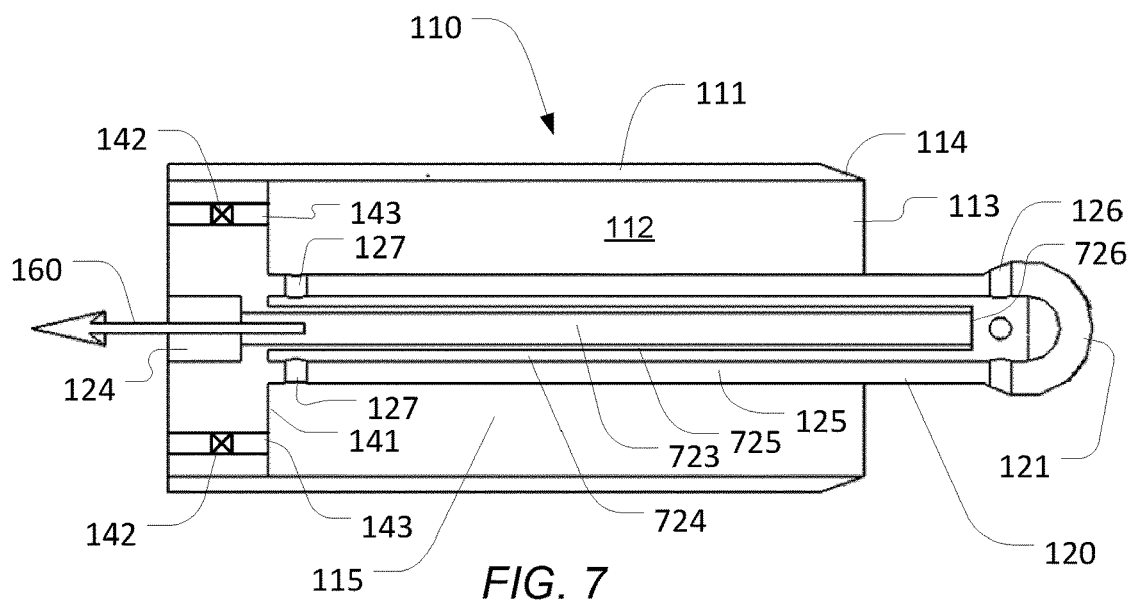
FIG. 7 illustrates yet another embodiment of a cutting device.

FIG. 7 shows a cross sectional view of a part of another embodiment a cutting device, e.g. of the cutting device of FIG. 2. The embodiment of FIG. 7 is similar to the embodiment of FIGS. 6A-6E, in that it comprises a drilling member 110 that is rotatably mountable to a carrying member to allow the drilling member to rotate around its longitudinal axis, a centering mandrel 120 which is circumferentially surrounded by the tubular drilling wall portion 111 of the drilling member 110 and arranged coaxial with the drilling member, all as described in connection with FIGS. 6A-6E except for the following modification of the mandrel:

As in the embodiment of FIGS. 6A-6E, the mandrel 120 of the embodiment of FIG. 7 has a mandrel wall portion 125 defining an interior mandrel space. However, in the embodiment of FIG. 7, the interior mandrel space includes an inner tubular portion 723 and an outer portion 724 circumferentially surrounding the inner tubular portion. The inner tubular portion 723 extends axially between an open end 726 proximal the leading end 121 of the mandrel 120 and a rear end proximal the rear portion of the mandrel. The inner tubular portion 723 is coaxial with the mandrel 120. The rear portion of the mandrel 120 has an inlet opening 124. The inlet opening 124 is configured to provide fluid communication between the inner tubular portion 723 of the interior mandrel space and is connected to a suction means (not explicitly shown in FIG. 7), e.g. a vacuum pump, configured to apply rearward suction to the inner tubular portion 723 of the interior mandrel space through inlet opening 124.

The outer portion 724 of the interior mandrel space is arranged radially outward relative to the inner tubular portion 723 and radially separated from the inner tubular portion by a dividing tubular wall 725. The outer portion is thus provided as an annular space that completely surrounds the inner tubular portion 723. The outer portion 724 is fluidly connected to the inner tubular portion 723 at the open leading end of the inner tubular portion. The outer portion 724 of the interior mandrel space extends axially between the leading end 121 of the mandrel to the rear end of the mandrel.

The mandrel wall portion 125 of the mandrel 120 comprises suction openings 126 arranged around the circumference of the leading portion of the mandrel 120, as described in connection with FIGS. 6A-6E. The mandrel 120 further comprises connecting conduits 127 providing fluid communication between the annular space 115 surrounding the rear portion 122 of the mandrel and the outer portion 724 of the interior mandrel space. As in the example of FIGS. 6A-6E, the connecting conduits 127 are positioned in the rear portion of the mandrel adjacent a rear wall portion 141 of the drilling member.

As in the previous examples, one or more venting valves 142 selectively allow airflow into the annular space 115 through venting openings 143 during withdrawal of the drilling member from the carcass upon completion of the cutting. Additionally, in the embodiment of FIG. 7, rearward suction 160 is applied to the inner tubular portion 723 of the interior mandrel space during withdrawal of the drilling member from the carcass. The suction causes the airflow that has entered the annular space 115 through venting openings 143, including any contaminants that may have been accumulated in the rear part of the annular space 115, to flow radially inward through the connecting conduits 127 into the outer portion 724 of the interior mandrel space. The airflow continues axially forward inside the outer portion 724 of the interior mandrel space towards the leading end 121 of the mandrel, then radially inward and through the open leading end 726 into the inner tubular portion 723, and then rearward through the inner tubular portion to the inlet opening 124. Similarly, any contaminants that may have been sucked into the interior mandrel space through suction openings 126 during the cutting, are also flushed out rearward through the inner tubular portion 723 of the interior mandrel space.

The invention claimed is:

1. A cutting device for cutting loose a rectum end portion of an animal carcass, comprising:
   a carrying member,
   a drilling member rotatably mounted on the carrying member, the drilling member comprising a tubular drilling wall portion surrounding an interior drilling space, the drilling wall portion having an open cutting end and a rear end opposite the open cutting end,
   a centering mandrel arranged coaxially with the drilling wall portion, the mandrel having a leading end, the leading end being configured to enter an anal opening of the carcass, at least a portion of the mandrel being circumferentially surrounded by the drilling wall portion so as to define an annular space circumferentially surrounding the mandrel,
   suction means for applying suction to the interior drilling space via one or more inlet openings,
   wherein the cutting device further comprises one or more venting openings, different from the one or more inlet openings and different from the open cutting end, configured to allow air to enter the interior drilling space.

2. The cutting device according to claim 1, wherein the suction means is configured to apply suction to the annular space circumferentially surrounding the mandrel.

3. The cutting device according to claim 1, wherein the suction means is configured to create a vacuum in the annular space for sucking a part of the rectum end and surrounding tissue, which has already been cut loose, into the interior drilling space.

4. The cutting device according to claim 1, wherein the one or more venting openings are configured to allow air to enter the interior drilling space, including the annular space surrounding the mandrel, while suction is applied by the suction means through the one or more inlet openings to at least the annular space surrounding the mandrel.

5. The cutting device according to claim 1, configured to establish a one-way airflow from the one or more venting openings to the one or more inlet openings without any reversal of airflow for flushing out contaminants from the interior drilling space.

6. The cutting device according to claim 1, configured to allow air to enter the interior drilling space through the one or more venting openings only after insertion of the open cutting end into the carcass or only after cutting free of the rectum end portion.

7. The cutting device according to claim 1, configured to allow air to enter the interior drilling space through the one or more venting openings only during and/or after withdrawal of the open cutting end from the carcass and/or from the cut-free rectum end portion.

8. The cutting device according to claim 1, comprising one or more venting valves configured to control an airflow into the interior drilling space through the one or more venting openings.

9. The cutting device according to claim 8, wherein the one or more venting valves are configured, during and/or after withdrawal of the open cutting end from the carcass after cutting loose the rectum end portion, to selectively allow air to enter the annular space through the one or more venting openings while suction is applied by the suction means to at least the annular space surrounding the mandrel.

10. The cutting device according to claim 8, wherein the one or more venting valves are configured to selectively prevent air completely or partly from entering the annular space through the one or more venting openings while the cutting device is advanced into the carcass and cuts tissue.

11. The cutting device according to claim 8, comprising control means for controlling operation of the one or more venting valves, wherein the control means is configured:
   during an initial cutting stage, to partly or completely close the one or more venting valves and to control the suction means to create a vacuum in at least the annular space surrounding the mandrel;
   during a subsequent withdrawal stage, to partly or completely open the one or more venting valves and to control the suction means to apply suction to at least the annular space surrounding the mandrel.

12. The cutting device according to claim 1, wherein the one or more venting openings are located proximal to the rear end of the drilling wall portion.

13. The cutting device according to claim 1, wherein the mandrel comprises a mandrel wall portion defining an interior mandrel space.

14. The cutting device according to claim 13, wherein the mandrel wall portion comprises one or more suction openings arranged proximal the leading end of the mandrel.

15. The cutting device according to claim 13, wherein the mandrel comprises the one or more inlet openings and wherein the suction means is configured to apply suction to the interior mandrel space via the one or more inlet openings and/or
   wherein the mandrel comprises one or more connecting conduits configured to provide fluid communication between the interior mandrel space and the annular space surrounding the mandrel.

16. The cutting device according to claim 15, wherein the interior mandrel space comprises an inner tubular portion and an outer portion circumferentially at least partly surrounding the inner tubular portion and radially separated from the inner tubular portion by one or more dividing walls, the inner tubular portion having a leading end proximal the leading end of the mandrel and a rear end opposite the leading end,
   wherein the inner tubular portion is fluidly connected to the outer portion at the leading end of the inner tubular portion;
   wherein the inner tubular portion comprises the one or more inlet openings and
   wherein the suction means is configured to apply suction to the inner tubular portion of the interior mandrel space via the one or more inlet openings in a direction away from the leading end of the inner tubular portion.

17. The cutting device according to claim 15, wherein the mandrel is arranged axially fixedly relative to the drilling member,
   wherein the leading end of the mandrel protrudes out of the open cutting end of the tubular drilling wall portion, and
   wherein the one or more connecting conduits are located proximal the rear end of the drilling wall portion.

18. The cutting device according to claim 1, wherein the mandrel is axially movable between at least a retracted position and an extended position,
   wherein the leading end of the mandrel protrudes out of the open cutting end of the drilling wall portion when the mandrel is in its extended position and
   wherein the leading end of the mandrel is located inside the interior drilling space when the mandrel is in its retracted position.

19. The cutting device according to claim 18,
   wherein the mandrel comprises one or more connecting conduits configured to provide fluid communication between the interior mandrel space and the annular space surrounding the mandrel;
   wherein the one or more connecting conduits are located inside the interior drilling space when the mandrel is in its retracted position and when the mandrel is in its extended position and/or
   wherein the one or more connecting conduits are located adjacent the rear end of the drilling wall portion when the mandrel is in its retracted position.

20. The cutting device according to claim 1, further comprising a bung holder circumferentially surrounding at least a part of the mandrel.

21. The cutting device according to claim 1, comprising one or more suction conduits fluidly connecting the suction means to the annular space surrounding the mandrel.

22. The cutting device according to claim 21, further comprising one or more venting conduits for transporting airflow via the one or more venting openings into the interior drilling space, the venting conduits being physically separate from the suction conduits through which suction is applied.

23. The cutting device according to claim 1, configured to establish by the suction means a pressure difference between the annular space surrounding the mandrel and the outside of the drilling member when the open cutting end of the tubular drilling wall is in contact with a carcass and substantially closed by tissue of the carcass.

24. A method for cutting free a rectum end portion of an animal carcass by cutting around the anal opening and rectum end with a cutting device, the method comprising:
   advancing a leading end of a mandrel into the anal opening of the animal carcass,
   cutting around the anal opening and along a part of the rectum end of the carcass with an open cutting end of a tubular drilling wall portion of a rotating drilling member, the tubular drilling wall portion defining an interior drilling space, at least a portion of the mandrel being circumferentially surrounded by the drilling wall portion so as to define an annular space surrounding the mandrel,
   applying suction via one or more inlet openings to the interior drilling space so as to create a vacuum in at least the annular space during the drilling,
   allowing air to enter the annular space through one or more venting openings of cutting device, the one or more venting openings being different from the one or more inlet openings and from the open cutting end of the drilling wall portion.

25. The method according to claim 24, wherein applying suction comprises applying suction via the one or more inlet openings to at least the annular space.

26. The method according to claim 24, comprising sucking a part of the rectum end and surrounding tissue, which has already been cut loose, into the interior drilling space.

27. The method according to claim 24, comprising:
- withdrawing the drilling member and the mandrel from the carcass,
- applying suction via the one or more inlet openings to at least the annular space while and/or after withdrawing the drilling member and the mandrel from the carcass,
- wherein allowing air to enter the annular space comprises allowing air to enter the annular space through the one or more venting openings at least while and/or after withdrawing the drilling member and the mandrel from the carcass.

28. The method according to claim 27, wherein air is allowed to enter the annular space through the one or more venting openings only while and/or after withdrawing the drilling member and the mandrel from the carcass.

29. The method according to claim 24, comprising controlling an airflow into the interior drilling space through the one or more venting openings by operating one or more venting valves.

30. A cutting system comprising:
- a robot with at least one industrial manipulator,
- at least one cutting device according to claim 1 connected to the at least one industrial manipulator.

\* \* \* \* \*